April 21, 1970     P. C. BROCKETT ET AL     3,508,192

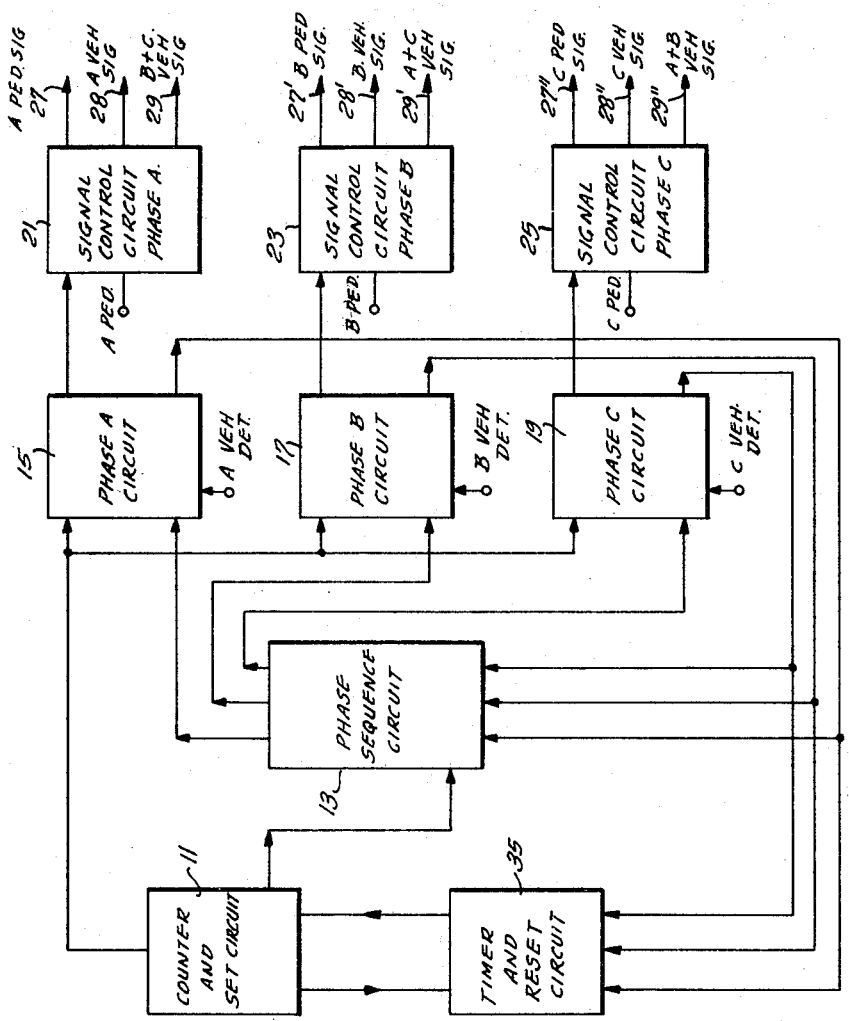
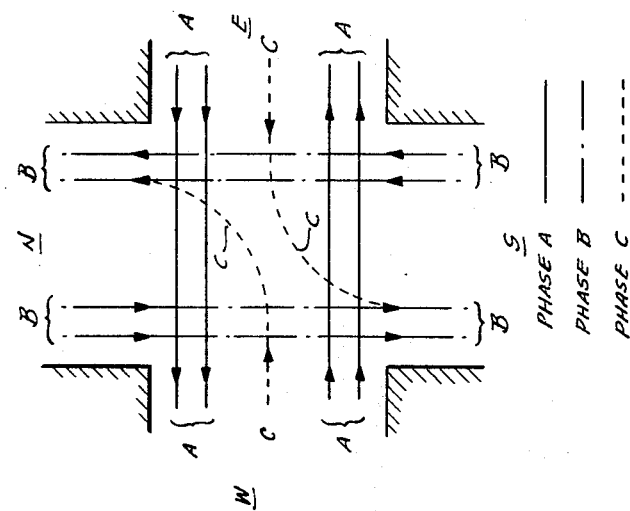

MULTI-PHASE TRAFFIC ACTUATED CONTROL SYSTEM

Filed Oct. 14, 1966     7 Sheets-Sheet 3

FIG.3

INVENTORS
CHARLES L. DUVIVIER
PETER C. BROCKETT
BY
ATTORNEYS

INVENTORS
CHARLES L. DUVIVIER
PETER C. BROCKETT
BY
ATTORNEYS

10 # United States Patent Office 3,508,192
Patented Apr. 21, 1970

3,508,192
MULTI-PHASE TRAFFIC ACTUATED CONTROL
SYSTEM
Peter C. Brockett, Milford, and Charles L. Du Vivier,
Darien, Conn., assignors to LFE Corporation,
Waltham, Mass., a corporation of Delaware
Filed Oct. 14, 1966, Ser. No. 586,881
Int. Cl. G08g 1/08
U.S. Cl. 340—37
6 Claims

ABSTRACT OF THE DISCLOSURE

A traffic actuated multi-phase traffic signal controller comprising modular components of solid state logic circuitry linked by solid state logic gating circuits. Individual phase circuit units for phases A, B and C have inputs for respective vehicle detectors and for pedestrian actuated devices, and outputs for signal control. The phase circuit units are coupled one at a time with a single multi-step counter by means of a phase sequence circuit which preselects, in a preparatory step in the counter circuit in the right of way period of any one phase, the phase circuit next to be coupled to the counter circuit, based on gating circuits indicating presence or absence of stored traffic actuation on the respective remaining phases awaiting right of way. The multi-step counter circuit provides control outputs for the respective steps for selection of timing controls and traffic actuated control for minimum initial, extendible and maximum green signal periods and for clearance signal periods for the coupled phase circuit, as well as for the preparatory step and subsequent completion step for next phase selection. Separate steps in the counter sequence are provided for pedestrian WALK and WAIT clearance signal sequence during the green signal period for vehicle traffic, with resetting of the counter for WALK–WAIT sequence in response to pedestrian actuation under certain conditions, and with setting of the counter to skip the pedestrian WALK and clearance steps in absence of pedestrian actuation.

---

This invention relates to an improved traffic-actuated control system of the multi-phase variety particularly adapted to meeting requirements of busy intersections in which phases having no traffic demands, upon election, may be omitted from passage-time considerations. The invention incorporates only solid state components and contemporary circuitry without moving parts.

For illustrative purposes, the invention will herein be set forth and described as a three-phase fully actuated circuit wherein the operation of the signal controllers is based upon the traffic density and demands.

In a three-phase system, as it will be herein described, each of the phases includes substantially identical components, except for the fact that only a single step-by-step selectively connectable electrical counting circuit for allocating different timing and control functions to different portions or phases of the operation is provided. This form of operation is used no matter which of the several traffic phases demand time sharing.

The system, as utilized, provides that the phases for maintaining a right of way may accept signals from either of the other phases and take away the right of way substantially immediately if no traffic demand is required on one phase, or, if traffic conditions are such that time delays must be experienced. If orderly control is provided, suitable delays may be introduced as necessary.

The timing intervals are capable of being varied between minimum and maximum values depending upon the demands placed on each of the plurality of phases. The passage time, in the case of vehicular traffic, is proportioned to the number of waiting cars. The system is so constituted that where traffic is passing on one phase but waiting on one or more of the other phases, the longer traffic waits, the more closely spaced must be the vehicles on the moving phase in order to retain the right of way. The system embodies appropriate means and circuitry for making a selective transfer and concurrently coupling the single counting circuit to different ones of the several phases while restricting the traffic and coupling to those phases which at the time require clearance. If desired, there may be eliminated from the consideration and switching any phases in which time-sharing is not required by reason of the lack of vehicle passing time being necessary.

The invention is further constituted by incorporating with the foregoing features suitable logic circuit combinations which are set up individually to each of the separate phases of the multi-phase system. The components are so arranged that an appropriate sequence unit, which also includes logic gating circuitry, is utilized to bring about a transfer and coupling of the counting circuit to one or another of the several phases and to initiate and complete the transfer at a selected position of the count.

Further, the circuitry is so set up that not only are the various phases controlled by the requirements of moving traffic, but the various intervals, phases and detector actuations are subjected to control by the presence of vehicles awaiting passage on the respective phases and also by pedestrian traffic desiring to cross the roadways with which the traffic indicators are associated. Any time there is a lack of vehicles in one or another of the phases and there is simultaneously a lack of pedestrian traffic on the same phase, the sequence switching circuits can operate so as to completely skip those phases. Usually, the pedestrian traffic is set up and controlled by push-button actuation and any operation of the traffic indicators to provide a so-called "walk period" for the pedestrian is always followed by a pedestrian clearance interval during which appropriate cautionary signals are displayed. However, during such pedestrian clearance time periods, the signals for vehicular traffic movement are also displayed, if necessary, so that during all pedestrian traffic movement, it is also possible to provide for vehicular movement.

The circuitry is so conceived that the single solid state counter can be selectively connected to that particular phase of the multi-phase system on which the instant demand has arisen to take precedence over other phases. When selection is made, the counter is arranged so that some steps may be used in common for both vehicular and pedestrian control. In other instances, where pedestrian control is not demanded, certain connecting steps applicable primarily to pedestrian traffic control can be skipped from the sequence. In other cases, where vehicular actuation of traffic movement is absent at the moment, control can be restricted to the pedestrian counter steps.

As the operation will be explained, the counter will be found to proceed through selecting steps for both pedestrians and vehicles. When pedestrian traffic is present, vehicular traffic will be permitted to proceed so that preparatory intervals for vehicular traffic movement will, in effect be established during the pedestrian movement. This permits a skipping of an otherwise used preparatory counter position for initiating vehicular traffic where pedestrian traffic is present. If pedestrian traffic is not present, then a preparatory position is usually established for the vehicular movement control.

The operation is such that this form of control of the counter on any selected phase is clearly usable even with but a single operation in one phase to be controlled.

In all cases, the counter circuit, as applied to any phase, serves to activate circuit elements acting through suitable timing circuits to activate or control the display of suitable traffic directing devices, such as lights, semaphores or the like. These controls are always effective through suitable timing circuits which control the duration of the display or provide a directive for guiding the progress of the traffic movement.

The circuitry has memory features included so that if calls are received for phases which are at any moment inactive, there will be built-in memory, as it were, so that upon completion of a timing cycle in an instantly operating and selecting phase, the control will switch to the phase where control is needed. The switching is controlled as to the time of occurrence so that the time is made substantially dependent upon the actual demand in the phase instantly active as compared to the phase calling for the switch of control. Then, with completion of the control cycle in one phase, a switch is made to another phase until all needed traffic movements are controlled.

Various forms of multi-phase systems of control may be adopted. A multi-phase operation illustratively may be required where one main traffic artery, for instance, is crossed at a single intersection by each of two other main or subsidiary traffic arteries, making for six roadways meeting at a common point and necessitating timesharing throughout. In other instances, a multi-phase traffic system of control may be adopted where a single main traffic artery, for instance, is crossed by a second traffic artery, say of lesser importance but with which it is necessary to provide not only for through traffic along each traffic artery but also to provide, for instance, left turn traffic from one of the arteries into the other. The left turn controls then may be completely separate from the phase controls for establishing through traffic movement which would cross the path of the turning vehicle. In some instances, except for limited time periods when traffic movement in all directions is arrested, it is possible to control the system, if so desired, to give right turn traffic substantially free access to the traffic artery to which it desires to move and this may be set up as a part of the third phase or the control may be added as a completely separate phase.

The various components by which the aforesaid type of traffic system is controlled are preferably assembled with little or no difficulty as modular elements for insertion in and removal from modular components. The various connections are established in known fashion with such forms of units contactors and printed circuit components arranged on suitable panels or sub-assemblies which are plug-connected and which may be easily removed from the controller for inspection or circuit change purposes. Usually, connections are established through a suitable form of multi-terminal plug from which contact is established to each plug connection of the different circuit boards. The ready removability of the boards establishes ease of servicing and greater overall long term reliability.

Various time-cycles to provide the desired types of movement of both pedestrian and vehicular traffic are contemplated and included. Illustratively, for the vehicular traffic movement, passage time may provide sufficiently long lapse periods to provide for walk period for pedestrians, pedestrian clearance periods and certain pedestrian waiting periods during which vehicular traffic can be moved and prepared for the stoppage of movement. Following this, there may be a clearance period for vehicles during which pedestrian traffic is also stopped and this then may be followed by a period of rest of all traffic after which a transfer occurs. In this sense, the vehicular traffic may be controlled between a minimum and a maximum period of pedestrian traffic while maintaining the other operations as described.

In systems which are known as the fully actuated type, the right of way between different traffic roadways is assigned on demand. Thus, if traffic is flowing on one roadway but there is an absence of traffic on the other roadway, the control will remain on the selected roadway. Systems known as the semi-actuated type normally provide a control on the main artery and control the side roads with demand. On conditions where there were no actuations on a particular roadway for more than one passage time interval prior to the actuation on the opposing roadway, the right of way may be transferred at once.

Within the foregoing format, it becomes one of the primary objectives of this invention to provide an improved form of traffic control adaptable to three or more traffic phases, with the control functioning through solid state components and being capable of functioning in accordance with either a fully actuated or a semi-actuated system under the control of a single counting circuit with which the several phases are connected individually in any selected sequence.

Other objects of the invention are those of providing a multi-phase traffic control system in which the initial interval timing may be varied between a minimum and a maximum value for each phase, with the beginning increment of passage time for each phase being matched to the number of waiting vehicles. A further object of the invention is that of providing a traffic control system of the multi-phase variety through the use of which access time will be given only to the intersection approaches actually requiring access and completely skipping those approaches that are momentarily free from traffic demands. Other objects of the invention are those of combining in a more efficient manner both the traffic control for multi-phase operations and joining therewith pedestrian controls which afford the pedestrian an adequate opportunity for crossing the different roadways irrespective of the traffic demand on any of them.

Still further objects of the invention are those of providing an improved traffic control system having greater efficiency, a better utilization of component parts, a complete lack of moving components and a control which is adapted to be reduced in size sufficiently to occupy minimal space and be capable of being mounted on panels insertable in and removable from control components with a minimum of difficulty.

The invention has been illustrated in certain of its preferred forms by the accompanying drawings wherein:

FIG. 1 is a schematic illustration of one of numerous forms of a three-phase traffic control pattern to which this invention is directly applicable;

FIG. 2 is a block logic diagram to show the general arrangement and relationship of the several component parts of which the system is comprised;

FIG. 3 is a schematic logic diagram showing one form of the counter and set circuits for determining the operation and with which each phase is connected at its passage intervals;

FIG. 5A is a schematic and logic circuit of the gap timing for the FIG. 5 circuit;

Figure 6:
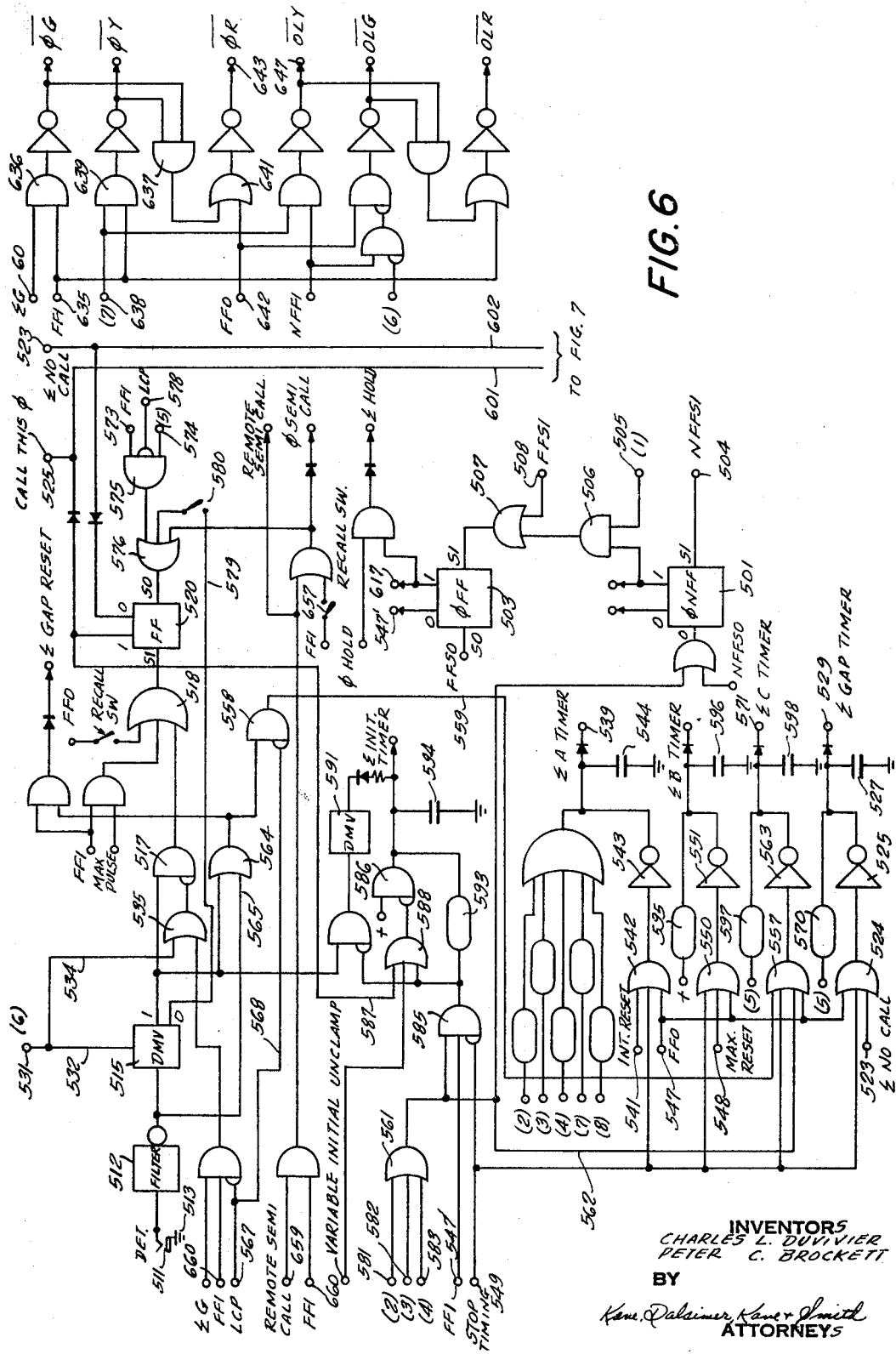
FIG. 6 is a schematic and logic diagram of a phase unit circuit for use in connection with any of the selected phases, this circuit being designed for indications of vehicle passage only.
Figure 8:
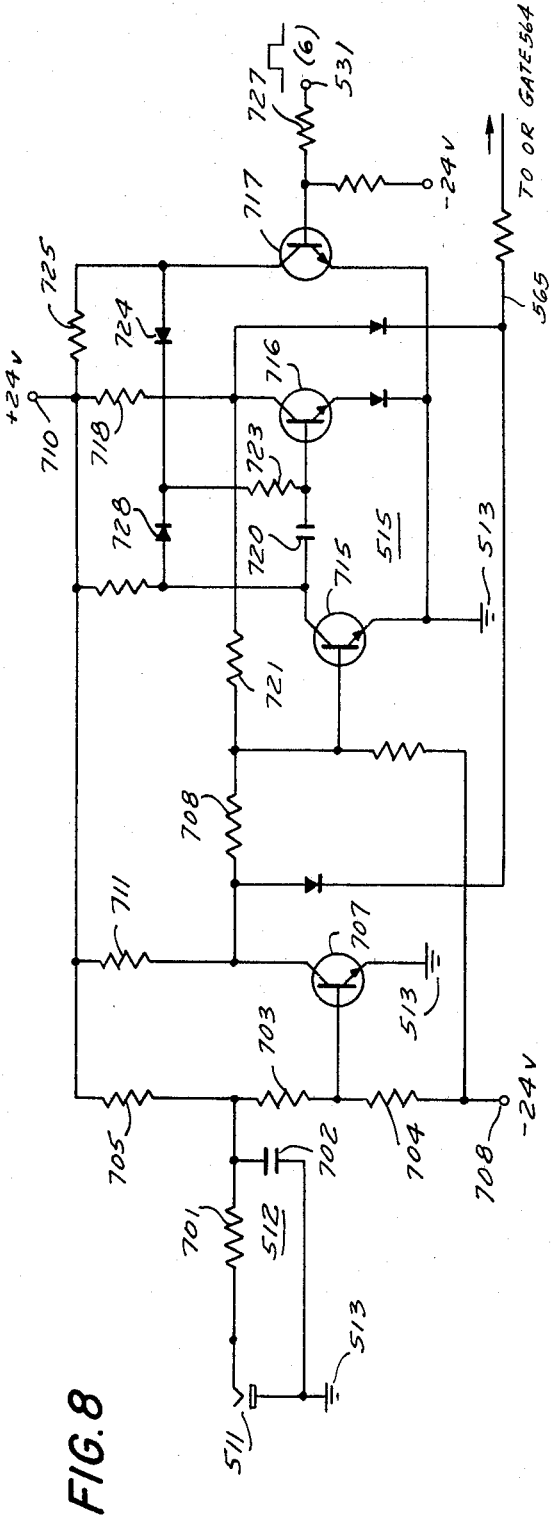

FIG. 7 is a circuit and logic diagram of a portion of a modified phase unit which is to be added to FIG. 6 to modify the FIG. 6 phase unit to adapt it to a control of both vehicular and pedestrian traffic; and FIG. 8 is a circuit diagram of a portion of the circuit of the phase unit of FIG. 7 to illustrate the application of certain memory features to the system and to provide for disabling for the duration of the preparatory pulse occurring prior to transfer of any operation of the switching and to hold any demand which may occur at the normal transfer time to a memory function which will be subsequently connected to another control of the operation.

Referring first to FIG. 1 of the drawings, two crossing traffic arteries are shown. One is assumed to extend between east and west, the other between north and south, with traffic movement planned for two directions on each artery, with left-turn permitted from one. For ease of reference, west to east and east to west traffic on the east-west artery (which will be called artery A) is shown by a plurality of solid line paths with arrow designations. Similarly, traffic in each direction along the north-south artery is depicted by the dot-dash lines shown for phase B in each direction. As a third phase, it may be assumed that provisions are made for left-turn traffic between the east-west artery and the north-south artery but no left-turn traffic between the north-south artery and the east-west artery. In this form, phase C of the traffic operation, may be assumed as including a left turn from the east-west artery to the north-south artery for vehicles traveling from east to south (as shown by dash lines) or from west to north to south-north (as also shown by dash lines). With this, right-turn passages may be permitted in all directions under "go" (or green light) conditions, that is, right turn from the north-south artery into the east-west artery, or right turn from the west-east artery into the north-south artery, and so on but not depicted by outline. The right-turn traffic phases may readily be combined with the two suggested left-turn phases, if desired. These assumed passages do not provide, as depicted, for any special controls related directly to pedestrian traffic, but the principles of control of the operation may include the pedestrian phases following the pattern herein to be explained in respect of the showing and diagrammatic representations of FIGS. 2 through 7.

If it be desired to provide left-turn traffic from the north-south artery into the west artery, an additional traffic phase may be provided to take this desire into account. The important factor is that the several traffic phases shall so proceed that traffic movements along one phase do not intersect or delay the traffic movements calculated to take place on the other phases. The foregoing diagram is thus explanatory of the general nature of the system and the uses to which it will be put.

In all forms of operation, signaling indications to establish a control of traffic movement, as well as traffic caution preparatory to a stop, and traffic stoppage are provided. With this, appropriate signalling indications are produced to take into account the pedestrian traffic and these normally are preferably supplemented to the vehicular control. The pedestrian control signals usually are of the "walk," the "wait" or "don't walk," and the flashing "don't walk" character, this form occurring between the "walk" and "don't walk" periods. Vehicular traffic control signals are developed during pedestrian periods to permit concurrent vehical movements.

In the operation, as diagrammatically represented by FIG. 2, a suitable counter and set circuit, schematically shown at 11, provides the necessary distinctive signal pulse indications to control the multiple steps of the traffic phases. A suitable phase sequence circuit, schematically shown at 13, provides the selection of the traffic phase to be controlled thereby developing control signals whereby controlling phase circuits 15, 17 and 19 of the three assumed traffic phases A, B and C, respectively, may determine the timing following a selection made by the sequence circuits.

At this point, it may be worth noting that the pulse signals supplied between the counter and set circuit 11 and any of the phase circuits 15, 17 and 19 (and effective one at a time) will be a series of signals of distinctive character to control the traffic movements between an initial green signal and the final transfer signal by which the control is turned over to a different phase of the operation. The phase sequence circuit unit 13 also provides three separate output signals which are fed as indicated to the respective circuits 15, 17 and 19 of the assumed phases A, B and C. Outputs from the various phase circuits A, B or C are supplied to the signal control circuits schematically represented at 21, 23 and 25 whose outputs are supplied to provide the control of designations to control lights or other devices of the instantaneously obtaining traffic conditions and thus establish a control on the traffic movement. Illustratively, conductors 27, 27' and 27'' for each of the phases A, B or C may be considered to provide the pedestrian signal indications. Control outputs 28, 28' and 28'' may be used to provide the vehicular signals for the related phase, and outputs 29, 29' and 29'' may be considered to provide the vehicular signal indications for the two channels other than that from which the signal connections originated.

Output signals from the various phase control circuits 15, 17 and 19 are supplied back to the phase sequence circuit 13 thereby to provide a supplemental control thereon in addition to the control derived from the counter and set circuit 11. The control from the counter and set circuit 11 includes interval designation information for the phase units, as will later be explained. These same signals are also supplied to the timer and reset circuit 35, also schematically represented in block. The various separate units depicted by FIG. 2 are exemplified in separate logic circuit diagrams to which reference may now be made.

The counter and set circuit is specificaly diagrammed in its details by FIG. 3. The counter 41 comprises two three-position units 42 and 43. These units each forming a trinary counter, are connected to obtain nine discrete count positions. These positions result in the development of signals adapted to control either or both vehicular and pedestrian traffic. In the first position, diagrammed at terminal 51, a signal is produced which is known as a "green skip." This is a signal of short duration. It provides a green signal to vehicular traffic without having the "walk" signal come up so that it is red or "don't walk" to pedestrians. It occurs at the beginning of the green period for any phase. In the second position, at terminal 52, a green signal is developed which is used for vehicles and also as a "walk" signal for pedestrians. The third position at terminal 53 also provides a green signal for vehicular traffic but, for pedestrians, a clearance signal or a flashing "don't walk" signal. At the fourth position at terminal 54, the signal for vehicles is green and this can be considered as the initial or starting signal period used when there are no pedestrian requirements on the phase. For pedestrians, it is "don't walk." The position will be found to be skipped if pedestrian traffic is present and is signal controlled.

At terminal 55, the fifth position signal is developed, which gives a green signal to provide a passage interval for vehicles but a "wait" or "don't walk" period for pedestrians. This signal always follows that signal developed in either the third or fourth positions at terminals 53 or 54. This position of the counter also serves as a vehicle rest position in a normally actuated phase of the operation.

The sixth position at terminal 56 is a preparatory interval during which the phase sequence unit, as will be described particularly in connection with FIG. 4, makes a selection and determination of which of the assumed three phases will be next in the controller sequence. This position is in the nature of a preparatory interval of short duration. It is always followed by a signal developed in the seventh position at terminal 557. Signals developed at terminal 57 represent the vehicular yellow clearance interval and this, of course, occurs during a period in which pedestrian traffic is arrested. The clearance interval is followed by signal output at terminal 58 for the eighth position which constitutes an all-red period for both vehicles and pedestrians. Then, at the termination of the all-red signal in the eighth position, a signal in the ninth position is available at terminal 59 which constitutes a transfer interval to which the controller advances and following which, transfer can take place. During this period of time, the phase flip-flops, which will later be discussed, are all turned off and the information left in the next phase flip-flop controls, as will be described, determine to which phase the controller will go as it advances from the transfer position at terminal 59 to the first position at terminal 51. In this connection, it will be recalled that but a single counter and set circuit of the type disclosed by FIG. 3 is used for the entire system so that the same counter and set circuit suffices for each phase of traffic control.

An additional output is obtained at terminal 60 from the counter circuits. This is known as a Σ green (summation green) lead. It is actually a positive output during all of positions (1) through (6) corresponding to output terminals 51 through 56 where the vehicle signal circuit is showing a green light to vehicular traffic.

For controlling the counter circuit, the advance pulse which corresponds to that developed at terminal 301 of the timing and reset circuit (see FIG. 5) is applied at the input terminal 61. The advance pulse normally serves to advance the counter mechanism from one position into the next in sequence of its distinctive positions through the complete cycle of nine positions.

As will be evident from what is to follow, the operation always starts in the (7) position which is "caution" or yellow in the vehicle portion of the cycle, as will be later explained. Nevertheless, for present explanatory purposes, it may be considered that if the counter reaches position (1) a pulse is available at output terminal 51. This would result when an advance pulse (as from terminal 301 of FIG. 5) is received at terminal 61 and supplied through conductor 62 through the inhibit AND gate 63 to be supplied by conductor 68 into the first stage 71 of a counter 41. This occurs at times when there is no inhibit (as will later be set forth) at the terminal 67 of the inhibit AND gate 63.

However, when a pedestrian call is present at terminal 92 it is passed through OR gate 93 and via conductor 115 inhibits any output, from inhibit AND gate 113, being fed from gate 113 via conductor 116 to OR gate 86. The output of gate 86 being thus prevented from inhibiting the advance signal at gate 63, allows the counter to be advanced in normal fashion from position 1 to position 2, the pedestrian walk interval. This causes the "WALK" signal at terminal 52 to be illuminated and thereby permit pedestrians to cross the street.

Suppose, however, that the controller has reached postion (1) at terminal 51 and there is no pedestrian call on the displayed phase, there will be no inhibit to the AND gate 113 which had a position (1) input. Under the circumstances, this gate will have an output in that position which inhibits the normal path for the advance pulse because, by the lack of any input for the summation of pedestrian calls at terminal 92 or any manual control exerted at terminal 94, there will be no output from the OR gate 93 and, consequently, conductor 115 connected to the inhibit of the inhibit AND gate 113 is ineffective to cut off output from the inhibit AND gate 113 at times when the (1) pulse is applied to conductor 114. Consequently, the output on conductor 116 will be supplied through the OR gate 86 to inhibit terminal 67. The same output which is applied to the conductor 116 to inhibit the inhibit AND gate 63 is applied along conductor 118 to the AND gate 65 along with the advance pulse on conductor 117 thereby to provide an output from the AND gate 65 via conductor 119 which sets the counter immediately to the position (4), which is the vehicle initial period, and provides an output at terminal 54. Under these conditions, the counter skips positions (2) and (3).

Suppose now that the counter had gone through positions (2) and (3) to serve pedestrians. The fact that the apparatus is in position (3) results in the presence of a pulse at input terminal 135 which is then supplied at conductors 136, 137 to the OR gate 86 to inhibit the inhibit AND gate 63 thereby to preclude the normal manner of advance through the AND gate 63 and conductor 68 to the counter. At the time period when the counter is in positions (2) and (3) there is a control to provide a green signal for vehicles on the phase. Also, in position (3) there is an output on the conductor 138 which is fed to the AND gate 66, along with the advance pulse from terminal 61, to provide an output from the AND gate 66 which is effective to set the controller promptly to position (5) at such times as the advance pulse does arrive. Under these circumstances, it can be seen that output from the AND gate 65 is inhibited because of the lack of signal voltage on conductor 118. Thus, at the same time that the controller moves to position (5) is skips position (4) which is the normal initial interval for vehicles.

The foregoing provides an alternate operation for the controller. If there are pedestrian calls which manifest themselves at terminal 92, positions (2 and (3) of the counter are used, these two combining to provide the initial interval for vehicular traffic. If conditions arise where there are no pedestrian calls, counter positions (2) and (3) are skipped and position (4) becomes the initial interval for vehicles and is timed separately. Now, when the controller counter arrives at position (5) and the input signal then resulting is available at terminal 90, if any pedestrian call has been received, for instance, during the pedestrian clearance interval or during the vehicle initial interval, if there are no calls anywhere else in the apparatus on other phases, the AND gate 89 combines all this information. The AND gate 89 inhibits normal operation of the inhibit AND gate 63 but its output acts via conductor 96 and AND gate 64 to recycle the pedestrian interval to again serve the pedestrians to provide a normal walk interval and pedestrian clearance interval before again advancing the counter to position (5) which is the regular vehicular passage interval.

Figure 4:
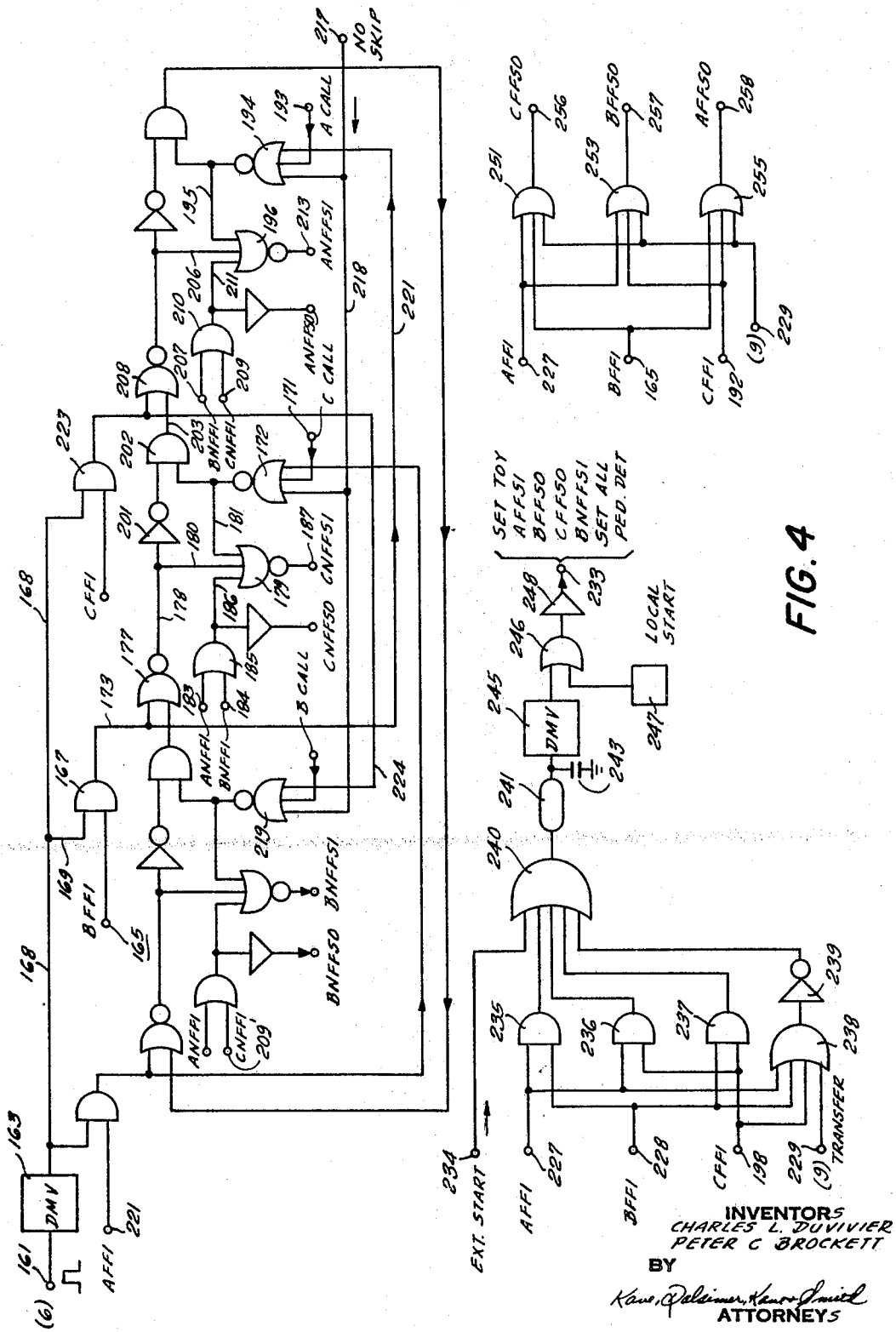
FIG. 4 is a schematic and logic diagram for the phase sequence unit for establishing the control.
Figure 5:
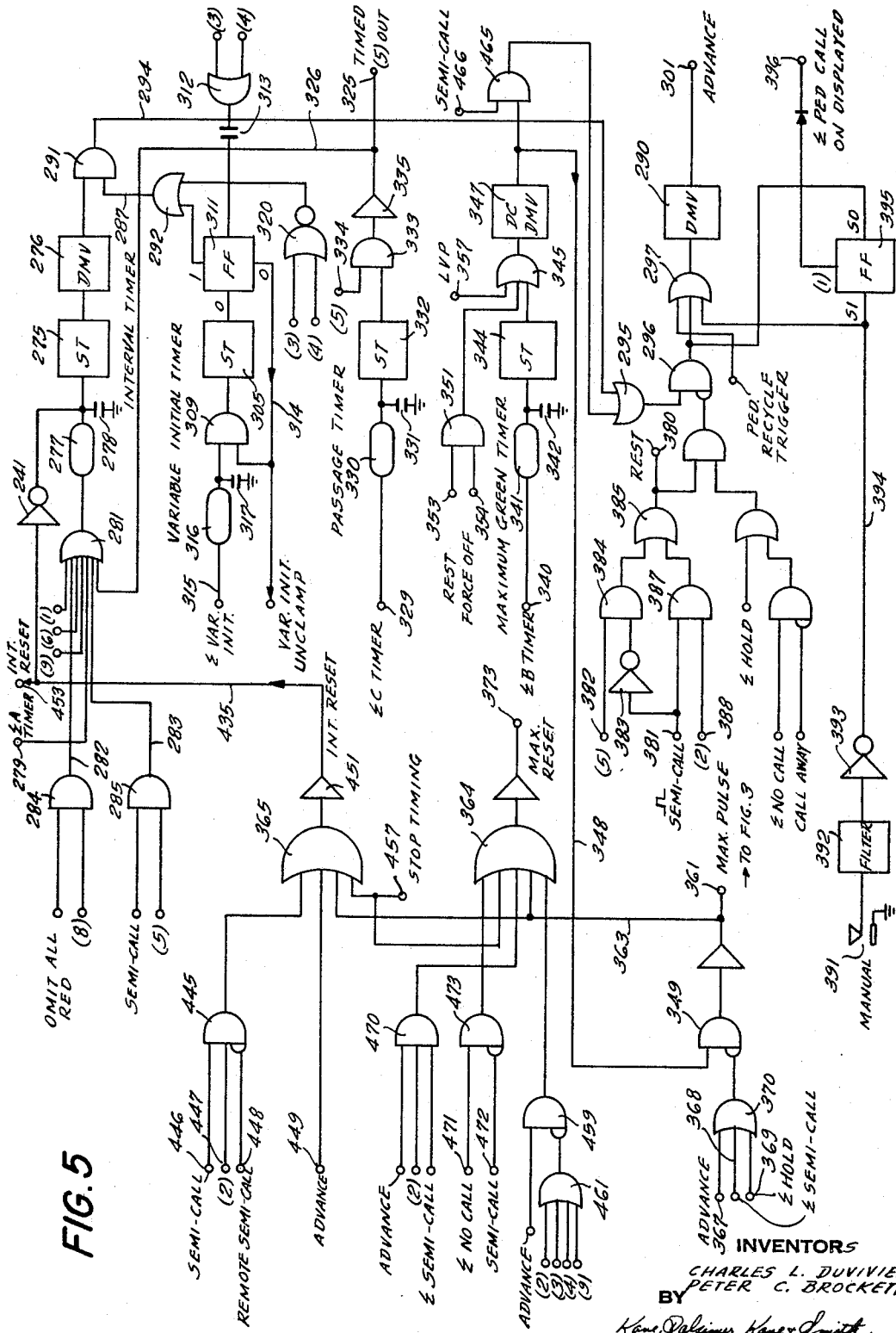
FIG. 5 is a schematic and logic diagram of a timing and reset circuit for functioning with the counter and set circuit.
Figures 5A, 7:
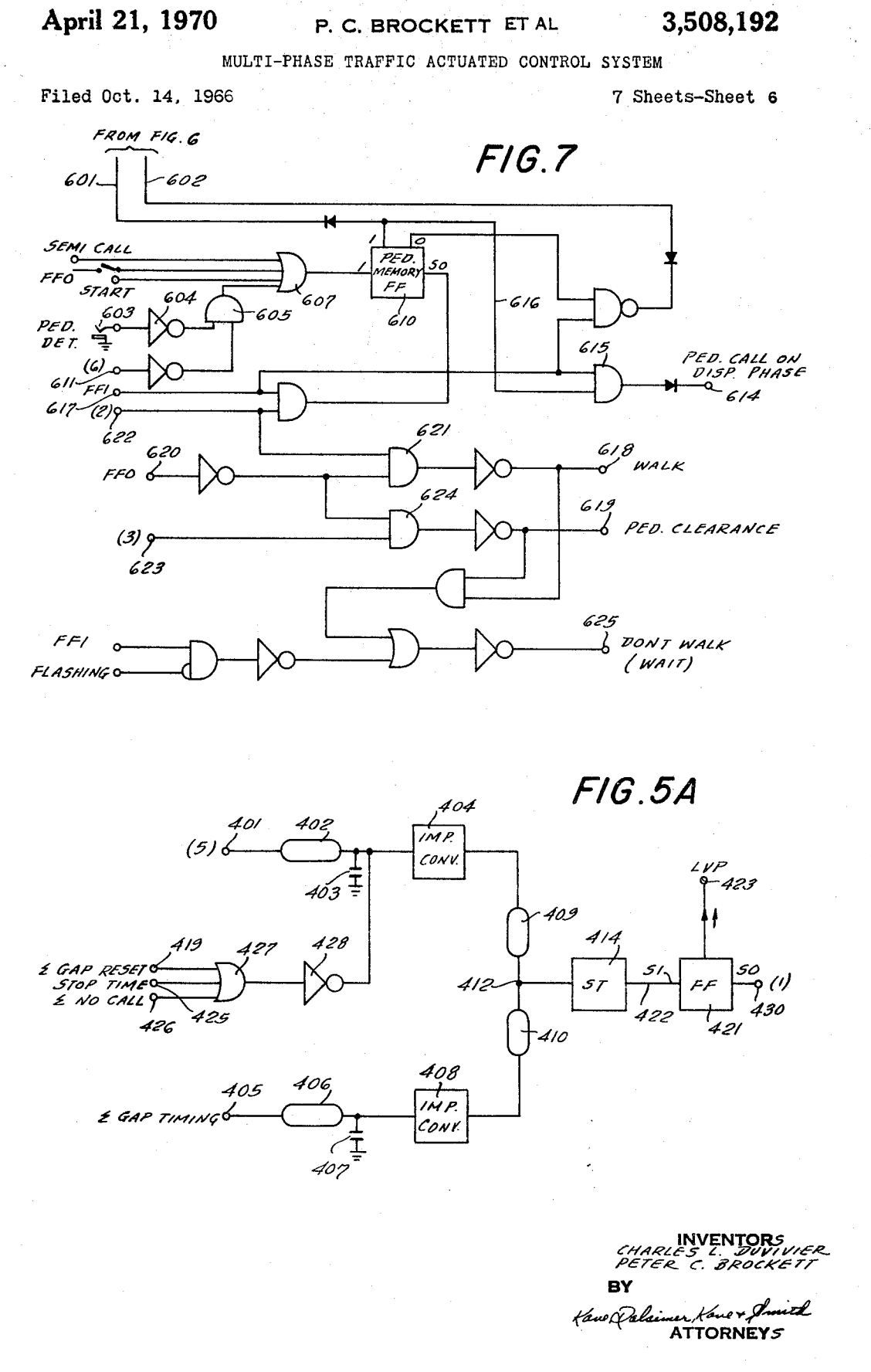

An additional input is obtained at terminal 84 from the maximum timer circuit as developed at terminal 361 of FIG. 5 which serves to set the counter directly to position (6) by conductor 139 and to the OR gate 82 acting into the counter sections 78 and 73. The output manifests itself through the conductor 129 and AND gate 106 in the event that the maximum timer is timed out. As was above explained, position (6) is the preparatory interval and is of very short duration during which the phase sequence unit, as particularly described in connection with FIG. 4 to follow, hunts for the next phase in the sequence to be activated and then advances to the yellow or caution position (7). The start interval obtained when the circuit is first connected to provide an input at terminal 83 which acts through conductor 143, sets the counter circuit to a (7) position through the AND gate 107 so that operation is always started in a vehicle clearance position. Under these conditions, the gating within the component is such that operation under phase A, for instance, will always occur in starting the operation.

With the operation of the counter and control as herein explained, there is normally connected at terminal 152 an output corresponding to that available in the (3) position at terminal 53. This voltage is effective on the multivibrator 151 to provide at its output a voltage which is called "flashing power." This output is applied to the various signal control boards of the controller to cause the pedestrian clearance interval to produce an output representation of "don't walk" or "wait" or the equivalent in the form of flashing lights or the equivalent for this period. The flash period can be varied but, normally, about one flash per second with about a 50% duty cycle has been found to be quite satisfactory. The circuit, as here explained, is also subject to a manual control at the terminal 94 where a control pulse can be fed into the control circuit 93 to inhibit the gate 113 in a fashion already explained.

The general type of trinary counter hereinabove described by the sections 42 and 43 of the diagrammatically shown counter 41 substantially duplicates the similar type of unit set forth and described particularly in connection with components 356 and 356' of FIG. 5 of U.S. Letters Patent No. 3,267,424 granted Aug. 16, 1966 to Peter C. Brockett and Charles L. Du Vivier, the present applicants. For the foregoing reasons, circuit details of the complete counter 41 have been here omitted but the substance of the issued patent is incorporated by reference.

A single counter circuit of the character above described suffices for all separate phases of the system. The phase sequence unit by which control is established and the counter is selectively switched between the several phases is diagrammatically depicted by FIG. 4. This determines which of the phase units is to be connected or turned on and which of the phase units is to be disconnected or turned off. The hunting for the phase having the next call takes place during the preparatory interval when the counter is in the (6) position, as at terminal 56. Whenever the counter reaches position (6), this fact is an indication that it has been called away from the phase that is presently displaying green. The counter is, therefore, ready to act to control some other phase which at the moment is presenting red signals.

To illustrate the operation, terminal 161 of the phase sequence unit diagrammed by FIG. 4 is connected to receive signals of the (6) position from terminal 56 of the counter circuit. These signals are then supplied to the delay multi-vibrator 163. For the purpose of explaining the operation of the circuitry to select the proper phase, it may be assumed initially and solely for illustrative purposes that the controller is presently operating in phase B and that a call has been received on phase C. This presents a problem that the circuit and control will have to be switched from one to another of the assumed three phases. At this time, the flip-flop lead for the B flip-flop will be energized to the (1) position. This flip-flop is connected to terminal 165 and provides through conductor 166 one input to the AND gate 167. The second input is provided by the output from the delay multi-vibrator 163 being supplied through conductors 168 and 169. Also, at this time, it may be assumed that the C call lead at terminal 171 is energized. As the controller, discussed particularly with FIG. 3, then advances to position (6) from position (5) and the preparatory pulse is obtained at terminal 56, the input terminal 161 is energized to provide a signal output from the delay multi-vibrator circuitry conventionally shown at 163. This output then combines in the AND circuit 167 with the B flip-flop (1) signals at terminal 165 to provide an output on conductor 173. This signal voltage now starts the hunting sequence to determine which phase of the several provided will be the next selected. The phase C call available at terminal 171 is supplied into the OR gate and inverter 172 so that no signal voltage appears at the output of the inverted C call OR gate. The output from the B flip-flop (1) condition (shown BFF1) at terminal 165 and the delay multi-vibrator is provided by the AND gate 167 and then supplied to the NOR gate 177. This input also generates a zero signal output (for the stated conditions) on conductor 178. The zero signal developed on conductor 178 feeds into the C next flip-flop set (1) NOR gate 179 by way of conductor 180. The output from the C call NOR gate 172 is then supplied to the C next flip-flop set (1) (shown as CNFFS1) gate 179 by way of conductor 181. At this time, since, for the assumed condition, neither the A next flip-flop nor the B next flip-flop are in the (1) condition, the third input 186 to the C next flip-flop set (1) NOR gate 179 will also be zero. At this point, it may be noted that the A next flip-flop (1) voltage is supplied at terminal 183 while the B next flip-flop (1) is supplied at the terminal 184. Each terminal leads to the OR gate 185 which supplies its output via conductor 186 to the C next flip-flop set (1) NOR gate 179. For the stated conditions, an output voltage will be available from the C next flip-flop set (1) gate at terminal 187.

Now, since the C next flip-flop in the C phase unit is thus set to the (1) condition, the C next flip-flop output is fed through OR gates shown to the left and right of the portion already discussed. This voltage is supplied to both terminals 209 and 209' and then, through appropriate amplifiers, holds both the B next flip-flop and the A next flip-flop in the zero condition as will later be more fully explained.

Let it now be assumed that the operation is in the B phase and there is no call on phase C but there is a call on phase A. The lack of a call on phase C, that is, no signal available at terminal 171, will create a signal output from the NOR circuit 172 thereby to provide an input signal to the C next flip-flop set (1) NOR gate 179 which prevents any output from this particular gate. Since it is now assumed that the A call lead is energized at terminal 193, there will be a zero output at the A call NOR gate 194 due to the A call. This output is connected by conductor 195 as one of the inputs to the A next flip-flop set (1) NOR gate 196. At this time, it will be recalled that the output of the B flip-flop (1) at terminal 165 and the output of the delay multi-vibrator 163 are supplied to the AND gate 167. This signal output is fed as one input to the NOR gate 177 where it generates a zero output on the conductor 178 and at the input of the inverter amplifier 201. The positive output of this inverter amplifier is then supplied through the AND gate 202 along with the positive output from the C call NOR gate 172. The resultant output from the AND gate 202 is then supplied by conductor 203 to the NOR gate 208 causing the output of this NOR gate to drop to zero.

This condition then removes the second input which had been supplied by conductor 206 to the A next flip-flop set (1) NOR gate 196. The third input to the A next flip-flop set (1) NOR gate 196 which would have been supplied by conductor 211 is also zero because at this time neither the B next flip-flop connected at terminal 207 nor the C next flip-flop connected at terminal 209 is in the (1) condition. Consequently, the output from the OR gate 210 supplied by conductor 211 is zero. The result is that the A next flip-flop set (1) NOR gate 196 provides a signal output at its terminal 213.

A no skip input may be provided in this circuit at terminal 217 to be supplied by way of conductor 218 effectively to place calls on all phases and thereby suggesting that the controller is never to skip a phase as a result of no actual call on the next phase because it gets a virtual call from the no skip input circuit into each of the NOR circuits 172, 194 and 219. This lead may be energized by some external circuitry as desired.

Further than this, it will be noted that when there is an output from the AND circuit 167, for instance, the output voltages are supplied not only to the NOR circuit 177 but also by way of the conductor 221 to the A call NOR gate 194 for instance. Similarly, output from the AND gate 223 representing a condition when the phase C flip-flop is in the (1) state and the counter is in the (6) position will be fed not only to the NOR gate 208 but will be fed back through the conductor 224 to the NOR gate 219.

Similar circuitry is provided with respect to all three phases. These utilize calls from the other phases and signals from the phase next flip-flop (see 501 on FIG. 6) so that the controller is completely symmetrical as far as hunting phase sequence logic is concerned.

If, due to transient pulses, all three phase flip-flop, are somehow set to zero, terminals 227, 228 and 198 will have no input signals applied to them. This would remove all inputs (except in position 9) from OR gate 238 and through inverter amplifier 239 apply a signal through OR gate 240 and the filter 241 through 243 to the DMV 245, thus generating a start signal at terminal 233, and setting the controller to phase A yellow interval.

Safety circuitry is provided, as shown on the diagrams below the sequence selection. As shown, the final output is available at terminal 233 where the counter is set to the (7) position as at terminal 57. Also, at this point, the A flip-flop is set to (1) and the B and C flip-flops are set to zero with the B next flip-flop also set to (1), and all pedestrian detectors are set.

Thus, in the position (9), where all phase flip-flops are set to zero, the red condition for all vehicles is displayed. At this time, one and only one phase next flip-flop can be on or in the (1) state and the others are in a zero (0) state indicating only the particular phase to which the controller is about to allocate the right of way.

The start circuit always sets the counter to position (7), which is the yellow, in which case, the A phase flip-flop is in the (1) condition and the B phase and C phase flip-flops are in the zero condition and, as above stated, the next flip-flop of the B phase is set to a (1) condition. This causes the controller to initiate its operation in phase A during the yellow clearance interval while the counter is in position (7). It also serves all pedestrian phases, as well as the vehicle phases, before it can come to rest as a result of no calls.

In addition to the circuitry above described, there is associated with the start circuitry certain protective circuitry whereby if any two phases, through noise conditions or transients of any type, arrive at the condition where two phase flip-flops are set to the (1) condition, the information is sensed and the controller is restarted because some condition has gone wrong. Also, with this circuitry, the safety circuit effectively provides that if none of the flip-flops are in the (1) condition and the control as a whole is not in the (9) position, the entire operation must again be restarted in phase A of the vehicle yellow position.

An external start lead is connected at the input terminal 234 of the same safety circuit so that an external control over the controller may be provided to drive it to the phase A yellow or to a start condition. This functions, as do the outputs from the AND circuits 235, 236, 237 and the OR circuit 238, through the amplifier inverter 239 to provide a control for the OR gate 240. Output from the OR gate 240 is supplied through the impedance network comprising a series impedance load element schematically represented at 241 and the shunt capacitor 243 energizing a delay multi-vibrator 245. Output from the delay multi-vibrator is supplied through the OR circuit 246, which may be locally started through a control schematically represented at 247, to provide a signal input to the amplifier 248 at whose output terminal 233 the various signals as above outlined are developed.

The safety circuit shown at the right of the figure is provided so that when any given phase flip-flop is in the (1) condition it supplies signals to the other phase units to insure that they are held in the "zero" or "off condition. In position (9), the transfer position of the controller, a signal is applied at terminal 229 which acts through gates 251, 253 and 255 to set all phase flip-flops to the "zero" or "off" condition, leaving information in the phase next flip-flops only, an indication of which phase will be next to be accorded the right-of-way.

Consideration may now be given to the timing and reset circuit diagrammatically depicted at 35 of FIG. 2. This timer circuit includes a Schmitt trigger circuit 275 followed by a delay multi-vibrator 276. This Schmitt trigger circuit has a short duration resistance capacity network at its input. This resistance-capacity circuit, comprising resistance 277 and capacitor 278, is used to time skip intervals and constitutes essentially a noise filter for inputs that are received from the individual phase unit timing RC networks. This timer is effective to control the length of time in all intervals of the controller receiving its input either directly from the counter at positions (1), (6) and (9) or from the phase units coming in on the A timer lead 279 or from the C timer in position (5) of the controller.

All of the stated input controls are supplied to the filter from the output of the OR gate 281 which is also supplied with inputs on conductors 282 and 283 from AND gates 284 and 285 which, respectively, are effective when there is a condition of omit all red occurring concurrently with the controller in position 8) and when there is a semi-call in position (5) of the controller.

The output from the interval timer and the delay multi-vibrator 276 is fed through various gates to control a second delay multi-vibrator 290. This delay multi-vibrator can conveniently be set up as one having about a 50 millisecond operating time. The feed path is through the AND gate 291 whose input is also controlled from the output of OR gate 292 of the variable initial timer, later to be discussed. The output from the AND gate 291 feeds through the conductor 294 to provide one input to the OR gate 295 which feeds into the inhibit AND gate 296, which, in the absence of any signal providing an inhibit, will feed this output into the OR gate 297 and thence to the delay multi-vibrator 290. The output from this delay multi-vibrator generates the advance pulse which is available at terminal 301 and is the pulse applied at several points in the system including the input terminal 61 in FIG. 3.

The advance pulse is supplied to the terminal 61 of the counter (FIG. 3) to advance it from one position to another. The same advance pulse is also supplied to various gates shown at the left of this FIG. 5 which will later be discussed.

A part of the timing and reset circuits of which there are five separate timers (four in addition to the interval timer already discussed) includes also the variable initial timer shown in this figure immediately below the interval timer. The variable initial timer includes a Schmitt trigger 305 together with various gates to operate in positions (3) and (4) of the controller. The variable initial timer operates during the initial intervals of the controller. It is fed through an AND gate 309 and feeds out through the OR gate 292 after controlling flip-flop 311 to provide the second input to the AND gate 291. The control by the Schmitt trigger 305 changes the position of the flip-flop 311 to its (1) position which gives an input to the OR gate 292. The flip-flop is also controlled from the OR gate 312, to which inputs of steps 3 and 4 of the counter as available at terminals 53 and 54 (see FIG. 3) are applied.

The OR gate 312 feeds through capacitor 313 into the flip-flop 311. The flip-flop in its (1) position provides one input to the OR gate 292. The zero position feeds back by conductor 314 to provide the second input to the AND circuit 309 and to provide a variable initial clamp. The second input to the AND gate 309 is the summation of the variable initial timers available at terminal point 315 and supplied through the filter comprising the series resistor 316 and shunt capacitor 317. The OR gate 292 is also supplied from the NOR gate 320 which also receives inputs representative of the counter in positions (3) and (4) as avaliable at terminals 53 and 54 (see FIG. 3). Accordingly, this forms another aspect of the invention and provides that the logic gating acts to control the operation in a manner whereby the longer time period of the initial or variable initial timer prevails to determine the time when the next advance pulse occurs.

In this state, the counter can be advanced by the output pulse available at terminal 301 to position (5) only if both the interval timer and the variable initial timer have each reached their critical levels of input and have triggered the Schmitt triggers 275 and 305 in their respective timers.

The C timer, which may also be considered as a passage timer, times the interval in position (5) of the controller only. Its output, when it times out at position (5) (as available at terminal 325), is supplied to the input of the interval timer by way of conductor 326 to cause it to give timed out indication and feed this signal on through to the assumed 50 millisecond delay multivibrator 290. Information from the passage timer is fed out as a timed out signal at terminal 325. In this respect, it may be noted that the summation of the C timers is available at terminal 329 and is supplied through the R–C filter comprising the series resistor 330 and shunt capacitor 331. The Schmitt trigger 332 connected thereto, in turn, supplies one input to the AND circuit 333. The other AND circuit input is supplied by signal voltages which occur in the position (5) control voltage connected to the input terminal 334.

The resultant output occurring at times when the counter is in position (5) is fed through the amplifier 335 to be used in external equipment to indicate the condition of the controller when in this position for any auxiliary equipment. A so-called B timer (which may be called also a maximum green timer) constitutes a fourth timer circuit. It receives its inputs at any of the green intervals at terminal 340. The supplied voltages are then fed through the filter comprsing the series resistor 341 and shunt capacitor 342 to control the operation of a Schmitt trigger 344. The output of the trigger 344 feeds through the OR gate 345 to control the D.C. delay multivibrator 347 and causes it to operate to feed a signal voltage via conductor 348 to an inhibit AND gate 349.

At the same time, two inputs to the OR gate 345 may be supplied. One such input represents a condition of rest at terminal 353 and the force-off voltage at terminal 354. The last signal that can be applied to the OR gate 345 is one indicative of the last vehicle passage supplied at terminal 357 (see also terminal 423 of FIG. 5A). In addition to providing for the production of a maximum pulse at terminal 361, the output from the inhibit AND gate 349 is provided by way of conductor 363 to each of the OR gates 364 and 365; the former constituting a means to provide the maximum pulse into the counter circuit to set the counter directly to position (6). The inhibit AND gate 349 output provides the maximum pulse at terminal 361, unless it is inhibited by the presence of an advance pulse at terminal 367, or a semi-call pulse at terminal 368, or a hold pulse at terminal 369. The presence of any one of the last named signals acts through the OR gate 370 upon the inhibit terminal of the inhibit AND gate 349 to preclude output therefrom.

In addition to the foregoing, the maximum pulse at terminal 361 may be used in the phase units (See FIG. 6) to cause a recall to that particular phase which was in operation at the time the maximum pulse was received. The maximum reset pulse is available at the terminal 373.

The group of gates shown at the lower right-hand portion of FIG. 5 provides information which indicates indicates which position of the counter is the rest position for this particular phase. The phase unit keys the semi-call in the phase unit itself and gives semi-call information only to that particular phase which is the one calling for semi-actuated operation. This is the information shown coming in to the rest position control gates at terminal 381. Assuming that no semi-call is being received at the terminal 381, then, under these conditions, the voltage available at position (5) of the counter corresponding to that of terminal 55 (FIG. 3) is supplied at input terminal 382 so that by virtue of the amplifier 383 (with inversion) output voltage signal is supplied to the AND gate 384. The output is also fed through the OR gate 385 to provide the condition of rest and generate rest information at terminal 380 which, under the assumed condition, would be in position (5) of the counter. This rest information is also supplied to terminal 353 mentioned above.

If, however, semi-actuated operation is called for, the semi-call line connected at terminal 381 will be energized and thus remove the input supplied from the amplifier with inversion to the AND gate 384. Also, this provides for giving an input on the AND gate 387 in position (2) (connected at terminal 388) to the AND gate 387. This rest information is then used in another AND gate to control the position in which the hold information, the call away information and the no call information are to become effective for preventing the controller from advancing out of the particular condition in the event of application of appropriate signals.

A manual input to the controller is connected from the location 391 through the filter 392 and an inverting amplifier 393 to supply a signal by way of conductor 394 to control the 50 millisecond delay multi-vibrator 290 to provide the advance each time the manual control 391 is closed or depressed. The same signal voltage on conductor 394 also sets the manual flip-flop 395 to the (1) condition thereby to indicate to the counter circuit that it should display pedestrian signals on each phase as the controller advances from position (1) to the next position in the sequence. This signal is available at the output terminal 396. The manual flip-flop can be reset to the zero condition only upon restoring the controller to its normal operating condition without manual operation. Under the circumstances, the stop timing and the manual control are used for operating the controller. It will then always display a pedestrian signal on every phase as the controller advances from one phase to another. Strictly vehicle operation can be restored only upon removal of the stop timing and the controller's advancing through its normal advance channels using the interval timing circuit.

If reference is made now to FIG. 5A, provisions for controlling the gap timing to establish the actual allowable gap between vehicles on the phase having the green signal will be noted. This circuitry comprises an input terminal 401 whereat a signal is available in position (5) at terminal 55 of FIG. 3. The circuit includes what may be considered a normal 15 second standard timing circuit. This is in the form of a series resistance 402 and a shunt capacitor 403 feeding into a suitable form of impedance converter 404 which prevents loading of the capacitor in the circuit. Appropriate gating is provided to allow the circuit to operate in the proper controller position. Another input to the circuit is made available at the input teminal 405 representing what will be called $\Sigma$ gap timing and can be regarded as the summation of the gap reduction timing. This also feeds through a filter comprising a series resistor element 406 and shunt capacitor 407 which energizes a second impedance converter 408. The outputs of the two impedance converters 404 and 408 are supplied to a summing circuit consisting of resistors 409 and 410. The general nature of the summing circuit and the associated impedance converters feeding it, consisting of the resistor and capacitor elements, and the impedance converters they feed is set forth in the copending patent application of Peter C. Brockett, filed Nov. 1, 1965 as Ser. No. 505,874, now U.S. Patent 3,416,130.

Suffice it for the purpose of this application and disclosure to state that the summing circuits provide at their junction 412 a voltage to energize the Schmitt trigger 414 at such time as the critical triggering voltage is reached. The voltage available at any time at the point 412 is dependent on the sum of the two signals generated at the input of the impedance converters. When the voltage at point 412 reaches the pre-established triggering level, the trigger is operated. The assumed 15 second timing circuit, comprising the resistor 402 and the capacitor 403, is reset periodically in position (5) of the counter by the $\Sigma$ gap reset input provided at terminal 419 from the phase unit having the green signal. As the phase unit gap timing circuit charges up slightly as a result of cars waiting in another phase against another signal, this gap reduction input is received in the lower circuit and fed through the impedance converter to the input of the Schmitt trigger and, effectively, adds a voltage to the output of the 15 second timing circuit. Thus, the voltage at the input of the Schmitt trigger at point 412 becomes progressively higher. Therefore, it requires less and less voltage at the 15 second timer to reach a level which will trigger the Schmitt trigger as cars are waiting a longer period against a red light. When the Schmitt trigger input reaches some assumed critical level the trigger feeds a signal to set the LVP (last vehicle passing) flip-flop 421 to a (1) position by an input from the Schmitt trigger as available on the conductor 422. This flip-flop then feeds an output which is shown as LVP to the terminal 423. This output is fed back to the phase units at terminal 567 (FIG. 6) to prevent any further resetting of the passage timer and any further resetting of the gap timer. It also starts the memory circuit so that any vehicle passing the detector following the occurrence of the LVP signal will be remembered and will recall the controller back to this phase at its next regular position in the traffic cycle. This is the LVP input provided also at terminal 357 (FIG. 5) and, if desired, is fed into the input of the D.C. delay multi-vibrator in the maximum timer circuit. This causes the controller to move directly out of the green position into position (6) and then, on to the next phase after appropriate clearance intervals have been provided. For these conditions, the maximum pulse developed at terminal 361 would cause recall to the phase that had been left as a result of having gapped out.

The LVP flip-flop is reset to its zero condition as the controller moves into position (1) of the next phase in the sequence. In such fashion, it is then available to operate for the next phase passage interval when the controller reaches position (5) of the next phase. The control of the timing circuit is set also by the stop time control at terminal point 425 and by the summation of no calls available at terminal 426, each fed through the OR gate 427 and the amplifier 428 with inverted output. The flip-flop 421 is provided with the input from position (1) of the counter by the connection made at terminal point 430.

The remaining gating shown by FIG. 5 not so far discussed is used to control the reset of the various normal timers which would be the interval timer as provided through control by way of conductor 435, the control of the maximum timer and the control of the maximum signal which would advance the counter directly to position (6) and give recall to the phase being left. AND gate 445 receives indications or signals from the semi-call at terminal 446; from the (2) position of the counter at terminal 447 and from a remote semi-call at terminal 448. This gate then, in effect, so operates that if there is a semi-call (that is, a semi-actuated call) and the counter is in position (2), it is possible to prevent the timing of the regular interval timer and hold it in a reset position. This woud allow then a maximum green timer to time the intervals shown on the maximum green control knob of that particular phase and, therefore, the duration of the "walk" signal of position (2) could be controlled in this particular phase under semi-actuated operation. However, this is not the case when the remote semi-actuated operation is called for and, consequently, an inhibit is placed in the gate to prevent reset of the interval timer if the remote semi-actuated signal is the one that is causing the semi-actuated call for this phase.

Any advance signal at terminal 449 (corresponding to the advance signal available at terminal 301 of this figure) which would advance the counter from one position to the next will cause reset of the interval timer by being supplied through the OR gate 365 and the amplifier 451 through conductor 435 to terminal 453. Stop timing available from terminal 457 is included to prevent the controller timing in the event of having received a stop timing signal from some external source. Operation of the maximum timer generates a maximum signal which is also included to cause reset of the interval timer, as already explained, in order that any interval will start timing with the timing capacitor discharged and so time the complete interval.

The maximum timer is reset by the stop timing input available at input terminal 457 as another input to the OR gate 364. The timer is also reset by operation of the maximum timer itself or by the advance pulse under certain conditions. An advance pulse in any of positions (2), (3), (4) or (9) of the counter is prevented from resetting the maximum timer circuit by the inhibit on the AND gate 459 which receives input from the OR gate 461 at its inhibit terminal at times when the counter is in any of positions (2), (3), (4) or (9). Consequently, an advance pulse occurring in any of these positions cannot operate the maximum timer reset circuit so that the maximum timer becomes a maximum green timer rather than a maximum extension interval timer.

As can be seen, certain additional gates are provided to connect the operation of the timer circuit for use when a phase is adjusted for semi-actuated operation. Under these conditions, the semi-actuated call line is energized and this has various effects in the overall circuit. At the output of the maximum timer the delay multi-vibrator 347 semi-call signal is fed into an AND gate 465 from a terminal 466 so that the maximum timer under semi-actuated conditions feeds the advance circuit directly rather than passing through the maximum signal circuitry. The semi-actuated call circuit inhibits the maximum signal from the maximum timer from being fed through and generating a pulse which causes the maximum reset and interval reset. However, it does combine with the advance pulse and the controller position (2) at AND gate 470 to give a reset of the maximum timer. This portion of the circuit is used during semi-actuated operation when the controller advances from position (2) into position (3). It is further used in order that the maximum timer capacitor may be reset after having completed its timing cycle when in position (2).

Another gate 473 having a "no call" input at terminal 471 and a semi-call input at terminal 472 as an inhibit signal is used when the controller in normal position has no call on the phases not being accorded the right of way. In this condition, the no call input keeps the maximum timer reset through the OR gate 364 and prevents the maximum circuit from timing until a call does come in on another phase. The addition of the semi-call signal as an inhibit at terminal 472 means that the maximum timer will time in position (2) and be effective in controlling the duration of the walk interval.

With this, reference may now be made to FIG. 6 in connection with the control of the phase unit operation. The phase circuits such as shown at 15, 17 and 19 in FIG. 2 will next be considered. The basic control of the phase unit is determined from the phase sequence unit as discussed in connection with FIG. 4. The phase sequence unit, as already mentioned, includes safety circuitry which establishes an operation limiting the control to only one phase unit at any one time.

Referring now more particularly to FIG. 6, two flip-flop units are first considered. These are the phase next flip-flop 501 and the phase flip-flop 503. If the particular phase with which these components are associated does not happen to be in operation at any given time, each of these flip-flops is in its zero state of operation. When the controller advances to the preparatory interval identified as position (6) with the voltage being obtained at the terminal 56 (FIG. 3), the phase sequence unit, as a result of being called to the phase under consideration, causes the phase next flip-flop 501 to be set to its (1) condition by a signal applied at the NFFS1 terminal 504. This indicates that this particular phase will be the next to have the right of way assigned to it. The one (1) output of the phase next flip-flop 501 is then applied to the signal control board where it is combined with the counter position information and causes controlled overlap signals ($\overline{OLY}$) of this phase to go yellow and all-red as the controller goes through the clearance intervals of the phase preceding this phase selected.

When the counter of the interval sequence unit reaches the position (1) and its applied at terminal 505, this information and the output from the phase next flip-flop 501 are combined in an AND gate 506 to provide a set to (1) condition in the phase flip-flop 503 by way of the OR circuit 507. There also may be applied through terminal 508 a flip-flop set (1) signal as indicated. When the phase flip-flop 503 is set to the (1) condition to indicate that this phase is now in operation, this signal is applied to the signal control board and through control circuitry illuminates appropriate vehicle signals and pedestrian signals (not shown) at the proper time. The phase flip-flop 503 (1) signal is also supplied to the safety circuit shown in the phase sequence unit of FIG. 4 to prevent any other phase from being set to the (1) condition as a result of noise pulses or the like. The phase flip-flop 503 then can remain in the (1) condition until the controller is called from this phase to another phase after all clearance intervals have been completed and the counter reaches the (9) or transfer position. When the counter is in the (9) or transfer position, as represented by the voltage at terminal 59 (FIG. 3), all signals are set red and all phase flip-flops are then set to the zero condition and only one of the phase next flip-flops is on, that being the phase to which the controller is called. The phase flip-flop zero and phase flip-flop (1) signals are used in the phase unit to obtain various functions but usually in connection with signals from the counter circuit indicating the controller positions.

In the operation signals are developed at the vehicle detector 511 and supplied through the input filter 512 and inverted. The vehicle detector shorts the filter to ground 513. The result of the inversion then is to apply a positive signal to a delay multi-vibrator 515. The positive signal resulting at the (1) output of delay multivibrator 515 is normally supplied through an inhibit AND gate 517 and an OR gate 518 (for which the output from the gate 517 forms one input) to energize the memory flip-flop 520. The result is that any actuation of the detector which occurs when the phase is not in the green condition will be "remembered" in the memory flip-flop 520 because of having set this flip-flop to the (1) condition as indicated by the numeral adjacent to the flip-flop. In the FIG. 6 circuit, the Σ no call line connected at terminal 523 supplies its voltage as an input to the OR gate 524 and through the amplifier 525, with its inversion at the output, which determines the charging applied to the capacitor 527 of the timer and determines the gap timing voltage available at the terminal 529. It will be noted that in the diagram, the Σ no call terminal 523 appears at both the upper portion of the diagram to the right of the memory flip-flop 520 and also in the lower left-hand corner. The ground condition on the no call signal is obtained by connection of the terminal point 523 to the zero terminal of the flip-flop. The memory flip-flop thus, in effect, tells the controller that there is now a call on one of the phases that does not, at the time, have the right of way. At the same time, the change in the position of the flip-flop 520 at the (1) terminal is reflected at the terminal point 525 which provides an indication of "call this phase" and indicates to the phase sequence unit (see FIG. 4) what phase is next to be allocated to the right of way.

Information of position (6) of the counter is fed into the delay multi-vibrator 515 by way of the terminal point 531 and conductor 532 and converts the delay multi-vibrator temporarily to a memory circuit. At the same time, the voltage representing condition (6) on the counter is also made available by way of conductor 534 and the OR gate 535 to provide an inhibit on the transfer of actuation information from delay multi-vibrator 515 into the memory flip-flop 520. Under the circumstances, during the preparatory position (6) of the counter, while the phase sequence unit is hunting for the next phase to be served, no change can occur in the memory flip-flop 520. The result is that no indecision is possible as a result of an actuation occurring during that hunting period. Any call that might be received during such an interval would set the delay multi-vibrator to a (1) position and lock it in that condition until after the position (6) information has been removed from terminal point 531. At such time, the inhibit on the inhibit AND gate 517 would be removed and the information would be transferred to the memory flip-flop 520 in the usual manner.

The ΣA timer (also known as the interval timer) is used to control the normal controller time intervals. This timer is actually located on the timing and reset circuitry described in connection with FIG. 5. The resistance capacity network for each phase is located in the phase unit of this figure. It is so arranged that the capacitor with the highest charge will be effective in applying an input signal to the timer circuit. The flip-flop (0) information is applied to the reset circuit of the capacitor in the phase unit so that any phase which does not have the right of way can keep its capacitor in a discharged condition and thus make the capacitor at that time ineffective to control the time of any interval. The phase which has the right of way will have its flip-flop circuit in the (1) condition and thus remove voltage from the phase flip-flop (0) zero lead and allow the interval timer capacitor for the A timer to charge to provide an output voltage at the terminal 539. The charging, of course, occurs through an appropriate timing resistor and it will be noted that the terminal point 539 connects to the ΣA timer leading to conductor 279 in FIG. 5. Each time the controller, as described by FIG. 3, moves from one position to another, a signal voltage is obtained on the conductor 435 (see FIG. 5) and this voltage is available at terminal 541 in FIG. 6. This signal voltage is then passed through the OR gate 542 and the amplifier (with inversion) 543 to hold the capacitor 544 in a discharged state, similarly to that of capacitor 527. Stop timing voltage is applied at the terminal 549 and, likewise, through the OR gate 542 and can maintain capacitor 544 discharged. The maximum timer circuit is similarly arranged. This maximum timer circuit, like others, is arranged on the timer and reset circuit board although the resistance capacity circuits for causing its control are usually arranged with the phase units of FIG. 6. The maximum timing circuit (i.e., the ΣB timer) has its capacitor 596 held in a discharged condition by either the phase flip-flop zero signal as available at terminals 547 and 547' or by the stop timing signal at the terminal 549. As indicated by terminal point 548, the maximum reset input voltage may also provide the same effect. All of these voltages are supplied through the OR circuit 550 and the amplifier with inversion 551 to provide the timing control and maintain capacitor 596 discharged. The maximum circuit, under the circumstances, starts timing as soon as the phase flip-flop is set to the (1) condition at the start of the green for the particular phase. This gives the controller the maximum green function rather than any maximum extension.

The passage timer, also identified as ΣC timer, is normally located with the timing and reset circuit and, as already explained, it is arranged to be effective only in position (5) of the phase establishing the passage interval. This capacitor 598 (charged through resistor 597) can be held in a discharged state, as was the capacitor 596 last discussed, in substantially the same fashion. For instance, the stop timing signal available at 549 is supplied as one signal into the OR gate 557. Also, there is supplied to this gate the output from the inhibit AND gate 558 later to be discussed and supplied through conductor 559. In addition, the zero voltage available at terminal 547 from the phase flip-flop 503 and, lastly, voltages determined by the controller in any of its positions (2), (3) or (4) as supplied through the OR gate 561 and conductor 562. Each of these voltages appearing at the output of the OR gate 557 is supplied through an amplifier inverter 563 to maintain capacitor 598 discharged. This insures that charging will start at the time the controller arrives at position (5) and that the charge will be accumulated from a completely discharged state of the capacitor and that no leakage can partially charge the capacitor during any of the pedestrian or initial intervals.

Considering now the inhibit AND gate 558 providing one of the voltages to hold the capacitor discharged, it may be noted that the inhibit AND gate 558 receives one of its voltage inputs from the OR gate 564 which is supplied from the (1) position output of the delay multi-vibrator 515 or, by virtue of the output from the filter 512 being supplied to the OR gate by conductor 565. The inhibit is only effective under the control of the input voltage at terminal 567 through conductor 568 due to the last car passage. The delay multi-vibrator 515 puts a minimum limit on the duration of a detector reset pulse to insure that the capacitor 598 will be discharged on extremely short detector pulses. Consequently, the circuit starts timing an interval as each car releases the detector.

The gap timing circuit, already briefly mentioned, may be located in part in the timer section with the timer components, with the resistance capacity circuit comprising resistor 570 and charging capacitor 527. Reset for this gap reduction timing capacitor is obtained from the phase flip-flop zero, as at terminal 547', and also from the stop timing voltage available at terminal 549 and from the no call line at terminal 523. This operates in the following manner.

A standard timing circuit comprising a resistor and capacitor is reset during the right of way period by the detector actuation on that phase which has the green signal. The gap reset signal is shown particularly by FIG. 5A as the Σ gap reset voltage available at terminal 419. This provides a measurement of the gap between successive actuations. In this phase unit, there is a control already identified as the Σ gap timer and represents the voltage available at terminal 529. This is actually the control for reducing the allowable gap between actuations. Where there is no call on some other phase during the passage interval, the Σ no call voltage available at terminal 523 will provide a signal which holds the gap timing capacitor 527 discharged and the maximum gap will be allowed. This, in either case, is longer than the possible time period that may be obtained in the passage timer circuit at terminal 571. However, when a vehicle arrives in a phase having the red signal, the voltage is removed from the Σ no call line connected at terminal 523 and the gap timer capacitor 527 is permited to charge. As the capacitor charges through an impedance, its voltage is applied to a circuit on the circuit associated with the timer and this reduces the voltage level necessary in the standard gap timing circuit to trigger the Schmitt trigger 414 (see FIG. 5A).

Thus, as a car waits against a red light in one phase, the circuit becomes more and more critical of the allowable gap between vehicles passing the detector on the phase having the right of way. This furnishes a time waiting gap reduction feature.

The memory flip-flop, already discussed, is restored to its zero or no call condition by the phase flip-flop (1) signal voltage and the passage interval (5) as obtained from the counter circuit. These voltages are applied respectively, at the terminals 573, 574 of the inhibit AND circuit 575 leading through the OR gate 576 to the flip-flop. Inhibit is applied on the gate 575 only at the time of last car passage as available at terminal 578. If, however, provided from the delay multi-vibrator 515 through conductor 579 and the switch 580 which may be connected to the set to zero input of the memory flip-flop, if switch 580 is closed. If this circuit is completed and if a detector actuation is received, it is passed through the normal gate path to set the memory flip-flop to the (1) condition. If the vehicle leaves the detector area and the actuation disappears, the circuit mentioned causes the memory flip-flop to be returned and restored to its zero condition.

A last car passage feature is available and at the time a vehicle is sufficiently late in arriving at the detector, when this phase has the right of way, the gap timer triggers a flip-flop which provides a signal on the LCP (or LVP) input at 567 and 578 to the phase unit. At the time when this signal is available, it has two effects. First of all, it prevents any further resetting of the C timer by inhibiting the inhibit AND gate 558, it being recalled that this timer times the passage interval. The voltage also starts a memory so that any detector actuation received after the LCP signal at terminal 578 will have a normal path available from the delay multi-vibrator to set the memory flip-flop to (1) and reset of the memory flip-flop to the zero condition is inhibited. Thus, a vehicle arriving too late to get a full passage time will be remembered and the controller will be called back to this phase. The passage timer output at terminal 571 completes its timing for the last vehicle that was allowed to reset it and the controller moves on to the next position upon completion of the passage timed interval.

The variable initial timer circuit is usually contained as a part of the timer and the Schmitt trigger can be common to all phases. The counting and timing circuit is found on the phase unit of FIG. 6. In any of the initial intervals, that is in the counter positions (2), (3) or (4), where the voltages appearing at this time are applied to the OR circuit 561 from terminal points 581, 582 or 583 provide that the capacitor 317 can be charged through the resistor or impedance 316 as controlled by the inhibit AND circuit 585. Here, it will be noted that one of the inputs to the inhibit AND circuit 585 has the output of the OR circuit 561. Another input is the phase flip-flop zero output at terminal 547' and the inhibit would be a stop timing signal applied at terminal 549. Whenever a critical value is reached on the Schmitt trigger 275, as in FIG. 5, it is triggered and the interval timer signal can be passed on to advance the controller to its next step or position. Then, when the controller advances to the passage interval, the variable initial timer can be clamped by the inhibit AND circuit 586 to a voltage just below the triggering level. This clamping action producing this voltage is achieved as a result of having neither a (1) signal from the output of flip-flop 520 on conductor 587 supplying the OR circuit 588 nor a signal from any of the (2), (3) or (4) positions of the counter.

When the controller finally leaves position (5) and a vehicle arrives at detector 511, the memory flip-flop 520, as already stated, is set to the (1) position and the clamped voltage applied through the inhibit AND gate 586 is removed from the capacitor 594. At the same time, a signal is applied from the detector delay multi-vibrator 515 to trigger the delay multi-vibrator 591. This operates to remove a small charge from the capacitor and the capacitor then remains in this condition. As each detector actuation is received at the detector 511, another unit of charge is removed from the capacitor 594. Consequently, the capacitor may be discharged to approximately zero level by a sufficiently large number of cars waiting against a red signal for this phase. The greater the number of actuations, the more the capacitor will be discharged and the longer it will take to recharge to the trigger level when the controller next reaches this phase initial interval. The variable initial timer intervals then become proportional to the number of actuations received during a red phase period.

The timing and reset conditions are so arranged that this last named circuit must be timed out as well as the interval timer capacitor (the ΣA timer and capacitor 544) so that the longer of these two time periods will predetermine and control the initial interval. Should only one car be waiting, the initial interval will have a minimum, depending upon the setting of the ΣA timer circuit. If a good many cars are waiting, the time necessary to recharge the capacitor 594 may be greater than the minimum setting and thus be effective in causing the initial interval to be extended to a longer period of time.

The pedestrian detector, memory, and signal circuits are described particularly in connection with FIG. 7 although they may be formed as a part of the signal control circuitry, as well as the vehicle signal control circuitry. All of the signal circuits operate from a plus supply voltage and all control circuits are completed through ground (usually not shown for convenience in the circuit diagram) to energize any of the signals. The logic, as heretofore described, always prescribes and depicts that a red signal will be displayed if neither the associated green nor yellow signals are on.

Considering now FIG. 7 jointly with FIG. 6, conductor 601 will receive the same voltage as that applied for calling the next phase at terminal 525. Conductor 602 will receive the same voltage as terminal 523 for the Σ no call condition. The control for the pedestrian actuation is by the schematically represented push button 603 which connects to the amplifier (with inversion) 604. The actuation of detector 603 connects the amplifier input to ground. The AND circuit 605 and OR circuit 607 lead to the pedestrian memory flip-flop 610. Actuation sets the memory to the (1) condition, which is a condition inhibited during the position (6) on the counter as available at input terminal 611 through the amplifier 612 with inversion. At this point, it may be noted that the closing of the pedestrian detector 603 produces an indicative signal which, when inverted, is effective at flip-flop 610. In this regard, it may be noted that one can safely assume that pedestrian actuation of the detector or push button 603 will endure for a time period of at least about 100 milliseconds, which is the normal duration of the skip timing of the counter in position (6). Under the circumstances, no pedestrian actuations are lost and possible indecision in the phase sequence unit during the hunting period can be avoided.

The pedestrian memory flip-flop 610, like the vehicular memory flip-flop 520, grounds the Σ no call condition, as available on conductor 602, and energizes the call line 601 for this phase. Then, when the controller, as described with the circuitry of FIG. 3, arrives at the (1) position of this phase, a signal is generated at the output terminal 614 representing a pedestrian call on the displayed phase. This is provided by way of AND gate 615 which receives one input from the (1) position of the pedestrian memory flip-flop 610 through conductor 616 and a second input from the terminal 617 representing a (1) condition of the phase flip-flop. This causes the counter in the interval sequence unit to move from position (1) to position (2). Without this information into the counter, it would have normally skipped positions (2) and (3), as above suggested, and moved directly to position (4) which is the initial interval and represents the voltage available at terminal 54 (FIG. 3). Position (2) and the one output of the phase flip-flop 503, available at terminal 617, then combine to cause the walk signal to be displayed and then reset the pedestrian memory flip-flop to its zero condition. Timing here is controlled by the interval timer (the A timer) voltage available at terminal 539 (FIG. 6) and the controller advances from position (2) to position (3) on completion of the timing interval. When the controller reaches position (3) the "walk" signal is removed at terminal 618 and the pedestrian clearance terminal 619 receives a control voltage. This is a flashing signal as already mentioned.

The walk signal here is controlled from the zero position of the flip-flop terminal 620 feeding into the AND circuit 621 and the controller being in the (2) position at terminal 622. The pedestrian clearance signal becomes available with the flip-flop in the zero position as at terminal 620 being supplied through the AND gate 624 during position (3) at the terminal 623 combining in the AND circuit 624 to determine the voltage at the terminal point 619. At the time when the controller leaves position (3) neither the walk signal at terminal 618 nor the pedestrian clearance signal at terminal 619 will be grounded so that the "don't walk" signal available at terminal 625 will be continuously energized and remain steady. The vehicle green signal is energized during the right of way period by gating from the (1) position of the phase flip-flop 503 (FIG. 6) and the Σ green voltage at terminal 60 (see FIG. 3 also). The yellow signal results from phase flip-flop (1) information of phase flip-flop 503 and the counter position (7) for vehicle clearance. If either the green phase or the yellow phase signal is illuminated it will turn off the red phase signal. The condition is established when the Σ green signal 60 and the flip-flop (1) voltage at terminal 635 through AND circuit 636 provide one input to the AND circuit 637 and where the second input to the AND circuit is provided from the (7) position or yellow on the counter applied at terminal 638 along with the flip-flop (1) voltage through the gate 639. Thus, the OR gate 641 and the amplifier (with inversion) provide for the turn off of the red signal. The flip-flop being in the zero state as at terminal 642 will provide a similar condition and also will become effective to insure that the phase connected at terminal 643 shall not be given the right of way and that the red signal must be illuminated.

The overlap vehicle signals are actually inverted phase signals and are always red when this phase is in operation. The green overlap signal is on when the phase flip-flop is in the zero position at terminal 642 except during clearance periods immediately prior to this operational phase. At the time the phase next flip-flop 501 is set to the (1) condition, which warns that this phase is the next to be served in sequence, position 7 of the counter is combined with the phase next FF1 and cause the overlap yellow signal at terminal 647 to be illuminated.

The recall switch 657 may be placed in the (4) or semi-actuated position, or, instead, a time clock or other device may energize an external lead to provide a remote control. The remote control is usually wired to be effective only at one phase of the controller, such as phase A. These two possible ways of calling for semi-actuated operation require generally different responses of the machine. If the semi-call is from a recall switch of a phase, such as 657, with the flip-flop in the (1) position, the controller will be called to that phase by a pedestrian call, time the interval indicated by the maximum for that phase, and, then, if there are no other calls on other phases, a rest condition will occur, with the walk light illuminated. When a call is then received on another phase, the controller moves to the pedestrian clearance interval and skips positions (4) and (5) and goes directly to position (6) and immediately to position (7) and vehicle clearance and so on. If, however, it happens that the semi-actuated call is from a remote position, such as at terminal 659, the controller will be called by a pedestrian call to phase A. It will then time the interval indicated by the walk conditions and rest with the walk light illuminated. Upon receipt of a call to another phase, the pedestrian clearance interval is timed and the controller advances, as above explained. These two conditions require that information be available to know by what manner semi-actuated operation is to be called for. This is provided by a set of gates as a part of the phase circuit that includes control from the phase flip-flop position (1) so that the remainder of the controller can tell in what phase semi-actuated operation is called for and provide a control accordingly.

In connection with the timing and reset circuitry whereby variable initial and minimum initial timing can be controlled, it is desirable to refer again to FIG. 5.

This variable initial circuit as can be seen, is actually tying together two timing circuits. The first timing circuit, which controls the minimum initial interval (which is ether position (4) of the counter or positions (2) and (3)) is the standard interval timer for the controller.

The other timer circuit is the variable initial timer which includes the block diagram impedance block 316, the capacitor 317, the AND circuit 309 and Schmitt trigger 305 and the flip-flop 311 along with gates 293 and 291. The action of gate 291 is such that it requires an output from the regular interval timer delay multi-vibrator 276 and an input from the gate 392 before it can give an output on conductor 294 to advance the counter to its next position in the sequence. During most intervals, gate 291 is fed through OR gate 292 from an inverted OR gate 320. This, therefore, indicates that in positions (3) or (4) of the counter there will be no signal from gate 320 into 292. In all other counter positions, that, is, other than positions (3) and (4), there will be an input from gate 320 to gate 292 and then to gate 291 so that during these other intervals, other than the initial intervals (3) and (4), the signal output from the regular interval timer delay multi-vibrator 276 will be fed through AND gate 291 and conductor 294 to energize the delay multi-vibrator 290 to produce a signal voltage at terminal 301 to advance the counter. However, in counter positions (3) or (4) no input is available from NOR gate 320 into OR gate 292 and, therefore, a signal must be obtained from the flip-flop 311 into gate 292 to furnish the second signal required for gate 291 in order that the interval timer signal from the delay multi-vibrator 276 can feed through to advance the counter.

The variable initial timer receives its input from the individual resistor capacity (R-C) circuits in the variable initial portion of the phase unit. This produces a voltage which would normally rest at a level just below that required to trigger the Schmitt trigger 305 in the variable initial timer circuit of FIG. 5. However, as vehicle actuations are received in an individual phase unit, the charge on the variable initial capacitor is reduced with each actuation. This requires that, as the circuit times the initial intervals of the controller, the more charges that had been bucketed out of this timing capacitor in the phase unit, the longer the capacitor will have to recharge before it reaches the level necessary to trigger the Schmitt trigger 305 of this timer diagram. Therefore, the longer it takes to time out to the level required at the Schmitt trigger of this FIG. 5, the longer it will take before a (1) output from flip-flop 311 can be developed to furnish the input to gate 291 necessary for the signal out of delay multi-vibrator 276 to be passed through on conductor 294 to advance the counter by the pulse developed at terminal 301.

In this way a circuit is obtained which will time an interval which has the output of two timing circuits combined in such a way that it requires both timing circuits to have completed their timing interval before the counter can advance to the next position. This action will occur only in positions (3) and (4) where it is desired to have this variable initial interval to be effective. That is, in position (2), for instance, the controller will have a signal to advance it to position (3) in the normal fashion. As it advances to position (3), however, it cannot set to position (5), the passage interval, until both minimum initial timer coming in from the phase units on line 279 reaches the critical level for the Schmitt trigger 275 in the interval timing circuit and also the input at 315 from the variable initial timer circuit of the phase unit is sufficient to trigger the Schmitt trigger 305, setting the flip-flop 311 to the (1) condition, and so furnishing the two signals necessary at gate 291 to feed the signal on through to advance the counter.

When a condition is reached where the flip-flop 311 is set to the (1) condition, the output from the zero (0) lead of this flip-flop is fed back into the AND gate 309 to prevent any further input signal from operating the Schmitt trigger 305, as already explained.

Also, a signal from the flip-flop 311 is fed via conductor 314 back to the phase units indicated as a variable initial unclamp voltage. In the phase unit, removal of this voltage clamps the variable initial timing capacitor at a level just below that required to trigger the Schmitt trigger 305 of FIG. 5. This clamp will remain effective throughout the other positions of the counter circuit and other phases of the controller operation until a signal is obtained at that phase detector circuit, when the clamp is removed and unit amounts of charge are bucketed out of that capacitor to again obtain additional timing in the initial interval for the vehicles that have arrived at that location against a red light.

Making reference now to FIG. 8 of the drawings, a control circuit particularly useful for controlling and locking the delay multi-vibrator 515 (as of FIG. 6) is set forth. As will be recalled from the discussion of FIG. 6, passing vehicles actuate detector 511 and through a filter 512 comprising a series resistor 701 and shunt capacitor 702 feed through resistor 703, forming a part of a voltage divider including also resistors 704 and 705, into the base input of a transistor inverter 707. The transistor is biased from a source of negative voltage of about 24 volts connected to terminal 708. There will be a positive voltage for biasing the collector derived at terminal 710 and supplied through load resistor 711 to the collector element. The output is obtained across the load resistor 711. The polarity at the collector of the transistor will be positive each time a vehicle actuates the detector 511 which would bring the accumulated charge on the capacitor 702 from the source 710 to substantially a ground potential at 513. The delay multi-vibrator combination 515 comprises the two usual cross-connected transistors shown at 715 and 716, with the addition of a locking transistor 717, as will be explained. The locking transistor 717 controls the operation of the circuit when the controller is in the (6) position, as explained in respect to the drawing of FIG. 6.

A signal developed at vehicle actuation detector 511, after feeding through the RC filter network consisting of 701 and 702, is essentially a ground signal and, after passing through 703, is applied to the base of transistor 707 driving it to a cutoff condition. As transistor 707 is driven to cutoff the collector being fed through resistor 711 from the plus 24 volt source goes in a positive direction, and this positive voltage feeding through resistor 708 to the base of transistor 715 drives transistor 715 into conduction. This initiates a pulse of timed duration from the output of this delay multi-vibrator. The positive output from this delay multivibrator is obtained at the collector of transistor 716. Transistors 715 and 716 are the two generally standard components of the delay multi-vibrator. In this showing, they are controlled in their operation by a locking transistor 717. Whenever the transistor 715 starts to conduct (as with a vehicle actuating detector 511), its collector goes to substantially ground potential. This negative-going signal is applied via 720 to the base emitter junction of the transistor 716 to drive the transistor into a cut-off state where its collector assumes a positive potential due to connection to the source 710 through resistor 718. This positive potential is then fed back through resistor 721 to the base of transistor 715 to maintain it in a conductive state as long as transistor 716 is cut off. Here, it will be noted that the base of transistor 716 has its return path through resistor 723, diode 724 and resistor 725, to the source of positive potential at terminal 710. Terminal 710 provides positive potential for the collectors of each of transistors 707, 715, 716 and 717. The resistor 725 is also in the collector circuit of the locking transistor 717. Under these circumstances, the base side of capacitor 720 will tend to charge in a positive direction through this resistor and diode for that length of time determined by the value of the capacitor and the resistance of the circuit. The charging will occur until the transistor 716 is again brought to a conductive state. The time constant network then determines the length of the output signal available at the collector of transistor 716 where the resultant positive signal is fed through suitable circuitry, as explained more particularly in connection with FIG. 6, to various circuits after the detector has been actuated.

If, however, the counter is in position (6) and a signal input is obtained at the detector 511, the voltage from the counter which is fed through the resistor 727 will carry the base of transistor 717 to a conducting state and thereby reduce the voltage at its collector essentially to ground potential, the emitter being grounded at 513. Under the circumstances, no positive return through the diode 724 can occur.

With no detector actuations at terminal 531, the collector of the transistor 715 is at a positive potential relative to ground and its collector voltage is then applied through the diode 728 to resistor 723 to carry the base of transistor 716 to a conducting state. If now actuation of the detector 511 occurs while the controller is in position (6) and transistor 717 is conducting, it can be seen that the collector of transistor 715 is immediately brought to a substantially zero voltage state and output from transistor 716 is provided. At times when the counter is in the position (6) to provide an input potential on the base of transistor 717 through resistor 727, the collectors of both transistors 717 and 715 will be at ground potential, thereby removing all positive potential from resistor 723 and therefore precluding the accumulation of charge in the capacitor 720. Under the circumstances, this prevents operation of the multi-vibrator combination 715 and 716 until after the counter of the controller has left position (6) and a signal voltage at terminal 531 has been removed. The delay multi-vibrator therefore becomes a straight memory device during that period of time when a positive potential signal is applied at the terminal 531 and to the multi-vibrator 515. The outputs from the multi-vibrator are clearly shown in FIG. 6.

Because of the locking effect of transistor 717 on the operation, during periods when the counter is in position (6) the complete controller is able to hunt during the position (6) interval without possibility of indecision in phase sequence hunting which, otherwise, would result should a call be received on the detector of one of the phases during this hunting interval.

In consideration of the Timing and Reset circuit set forth by logic diagram, FIG. 5, and the phase units as set forth by the logic diagram of FIG. 6, a timing capacitor 544 is shown in FIG. 6 indicating one timing capacitor for that timing circuit for each phase of the complete controller. It will be appreciated that the lead at terminal 539 of FIG. 6 of each of the phase units will be tied together and connected to terminal 279 the ΣA Timer Input of FIG. 5. Under these conditions a separate capacitor is used for timing intervals in each of the phases. However, it will be appreciated that a common capacitor could be tied to the terminal 279 at the input of the Interval Timer of FIG. 5 and therefore one capacitor could serve to time the intervals for all phases in sequence.

However, generally speaking the use of a separate capacitor for each phase is to be preferred because the components are normally mounted on circuit boards connected into a Modular Unit and replacement and modifications and servicing thus become simplified if separate capacitors are used for each phase. This, of course, likewise holds true for each of the other Timing circuits in the phase units. Calibration of the Timing circuits is also greatly improved by using separate capacitors for each of the phase units because being mounted on the Phase Units the capacitors are intimately tied to the charging resistors for each particular circuit and therefore are intimately tied with the calibration which compensates for capacitor sizes along with resistor values.

Many other modifications, of course, may be made and included in the logic and described system without departing from either spirit or scope as here and above set forth.

Having now described the invention what is claimed is:

1. A multi-phase traffic control system comprising, in combination, a step-by-step electronic counting circuit for producing distinctive control signals in a multiple sequence of steps for allocating different control functions and timing of traffic flow, traffic actuated circuit means for indicating traffic demands individual to each phase, a phase unit logic circuit combination individual to each phase of the multi-phase group for determining the control steps and timing effective in the related phase at times when control is transferred thereto, selecting circuit means for determining which single phase of the multi-phase group should next be controlled to provide for traffic movement in the selected phase, means controlled by the selecting circuit means for selectively connecting the counting circuit to the logic circuitry of the selected separate phase and then for transfering the control to another demanding phase following completion of the count, timing circuit means individual to each phase to establish the time period of connection of the phase to the counting circuit when traffic movement on another phase is stopped and awaiting a controlled movement, sensing means common to all phases for responding to the output of the individual timing means to provide for advancing the step-by-step electronic counting circuit, means to control the selecting circuit means to skip from the sequence of traffic phases selected those phases of the cycle of the multi-phase on which there is an absence of traffic demands, and means to establish an initial variable control signal interval in accordance with the number of vehicles waiting against a traffic arrest movement status.

2. A multi-phase traffic control system comprising, in combination, a step-by-step electronic counting circuit for producing distinctive control signals in a multiple sequence of steps for allocating different control functions and timings of traffic flow, traffic actuated circuit means for indicating traffic demands individual to each phase, a phase unit logic circuit combination individual to each phase of the multi-phase group for determining the control steps and timing effective in the related phase at times when control is transferred thereto, selecting circuit means for determining which single phase of the multi-phase should next be controlled to provide for traffic movement in the selected phase, means controlled by the selecting circuit means for selectively connecting the counting circuit to the logic circuitry of the selected separate phase and then for transferring the control to another demanding phase following completion of the count, timing circuit means individual to each phase to establish the time period of connection of the phase to the counting circuit when traffic movement on another phase is stopped and awaiting a controlled movement, sensing means common to all phases for responding to the output of the individual timing means to provide for advancing the step-by-step electronic counting circuit.

and means to prevent recycle of the pedestrian intervals on the phase having right of way during periods when vehicular or pedestrian control is required on an opposite phase.

3. A multi-phase traffic control system comprising, in combination, a step-by-step electronic counting circuit for producing distinctive control signals in a multiple sequence of steps for allocating different control functions and timings of traffic flow, traffic actuated circuit means for indicating traffic demands individual to each phase, a phase unit logic circuit combination individual to each phase of the multi-phase group for determining the control steps and timing effective in the related phase at times when control is transferred thereto, selecting circuit means for determining which single phase of the multi-phase group should next be controlled to provide for traffic movement in the selected phase, means controlled by the selecting circuit means for selectively connecting the counting circuit to the logic circuitry of the selected separate phase and then for transferring the control to another demanding phase following completion of the count, timing circuit means individual to each phase to establish the time period of connection of the phase to the counting circuit when traffic movement on another phase is stopped and awaiting a controlled movement, sensing means common to all phases for responding to the output of the individual timing means to provide for advancing the step-by-step electronic counting circuit, and sensing means adapted to respond to the input of the individual timing means to provide for advancing the step-by-step electronic counting circuit.

4. A multi-phase traffic control system comprising, in combination, a step-by-step electronic counting circuit for producing distinctive control signals in a multiple sequence of steps for allocating different control functions and timings of traffic flow, traffic actuated circuit means for indicating traffic demands individual to each phase, a phase unit logic circuit combination individual to each phase of the multi-phase group for determining the control steps and timing effective in the related phase at times when control is transferred thereto, selecting circuit means for determining which single phase of the multi-phase group should next be controlled to provide for traffic movement in the selected phase, means controlled by the selecting circuit means for selectively connecting the counting circuit to the logic circuitry of the selected separate phase and then for transferring the control to another demanding phase following completion of the count, timing circuit means individual to each phase to establish the time period of connection of the phase to the counting circuit when traffic movement on another phase is stopped and awaiting a controlled movement, sensing means common to all phases for responding to the output of the individual timing means to provide for advancing the step-by-step electronic counting circuit, an interval timer means and a variable initial timer means included with the sensing means for advancing the step-by-step electronic counting circuit, said two timing means having timing periods which may differ in accordance with the number of vehicles waiting on the controlled phase, and means to limit the controller advance in the step-by-step counting circuit to a period controlled by the timer circuits until the expiration of the longer of the two established time periods.

5. A multi-phase traffic control system comprising, in combination, a step-by-step electronic counting circuit for producing distinctive control signals in a multiple sequence of steps for allocating different control functions and timings of traffic flow, traffic actuated circuit means for indicaitng traffic demands individual to each phase, a phase unit logic circuit combination individual to each phase of the multi-phase group for determining the control steps and timing effective in the related phase at times when control is transferred thereto, selecting circuit means for determining which single phase of the multi-phase group should next be controlled to provide for traffic movement in the selected phase, means controlled by the selecting circuit means for selectively connecting the counting circuit to the logic circuitry of the selected separate phase and then for transferring the control to another demanding phase following completion of the count, timing circuit means individual to each phase to establish the time period of connection of the phase to the counting circuit when traffic movement on another phase is stopped and awaiting a controlled movement, sensing means common to all phases for responding to the output of the individual timing means to provide for advancing the step-by-step electronic counting circuit, an interval timer means and a variable initial timer means included with the sensing means for advancing the step-by-step electronic counting circuit, said two timing means having timing periods subject to differences in accordance with the number of vehicles waiting on the controlled phase, and means to control the advance of the controller in the step-by-step counting circuit so that the initial interval for control advance requires that the time intervals of each timing circuit shall have expired and that the longer of the two timing periods shall have the control preference.

6. A multi-phase traffic control system comprising, in combination, a step-by-step electronic counting circuit for producing a sequence of distinctive control signals and for allocating the signals of the series to different control functions and timings of traffic flow for each of pedestrian and vehicular movements, traffic actuated circuit means for indicating traffic demands individual to each phase, circuit means for selecting a single phase from the multi-phase controlled group for control in accordance with the demand for traffic movement in the several phases, means for normally selecting the phases of the multi-phase group in a cyclic order during conditions of traffic demands on all phases, means for skipping from the selection of phases those phases not demanding control during the periods of traffic demands on the other phases while retaining the cyclic order of selection except for a skipped phase, a logic circuit combination individual to each phase to determine the control steps of the counter required in any selection to meet the demands of traffic control of each of vehicular and pedestrian movements on the selected phase, means to associate the counting circuit at any instant only to that phase instantaneously selected so that a single counting circuit suffices for all phases, means for controlling the time duration of the control in each step of the counting circuit during its cyclic movement for control in each phase, means included in each logic circuit individual to each phase of the multi-phase group for storing an indication of traffic demands occurring during an association of the counter circuit with another phase or during the transition period within which the counting circuit is transferred from one phase to another, and means for controlling the rate of advance of the counter from one step to another in accordance with the time periods set in each phase.

References Cited

UNITED STATES PATENTS

| | | | |
|---|---|---|---|
| 3,191,148 | 6/1965 | Hilliker | 340—37 |
| 3,281,782 | 10/1966 | Frielinghaus | 340—37 |
| 3,376,546 | 4/1968 | Cress et al. | 340—37 |

JOHN W. CALDWELL, Primary Examiner

C. M. MARMELSTEIN, Assistant Examiner

U.S. Cl. X.R.

340—31